United States Patent [19]

Johnson et al.

[11] 4,057,793

[45] Nov. 8, 1977

[54] CURRENT CARRIER COMMUNICATION SYSTEM

[76] Inventors: Raymond E. Johnson, 705 SW. 7th St., Fort Lauderdale, Fla. 33315; Boris Ellison, 6210 SW. 145th St., Miami, Fla. 33158

[21] Appl. No.: 626,071

[22] Filed: Oct. 28, 1975

[51] Int. Cl.$^2$ .......................................... H04M 11/04
[52] U.S. Cl. ............................... 340/310 R; 307/126; 325/320; 325/323
[58] Field of Search .................................... 340/312 R

[56] References Cited

U.S. PATENT DOCUMENTS

| | | | |
|---|---|---|---|
| 3,818,481 | 6/1974 | Dorfman | 340/310 R |
| 3,909,618 | 9/1975 | Fujii | 340/310 R |

*Primary Examiner*—Thomas B. Habecker

[57] ABSTRACT

A current carrier communication system for selectively transmitting binary electrical signals from a first location to a second location over the AC power lines in a AC power distribution network in a building comprising a first tone generating means operatively connected to a first source of binary electrical signals for generating a first tone signal at a first frequency, a second tone generating means operatively connected to a second source of binary electrical signals for generating a second tone signal at a second frequency, linear tone summing means operatively connected to the first and second tone generating means for generating a modulating signal output that is a linear sum of the first and second tone signals, a source of RF signals connected to said linear tone summing means to produce a modulated RF output signal modulated by the modulating signal output of the linear tone summing means to the AC power lines, receiver coupling means at said second location directly coupled to receive said modulated RF output signal therefrom, a TRF multi-stage receiver connected for receiving the modulated RF output signal from the AC power lines and producing an amplified modulated RF output signal corresponding to the received modulated RF output signal, demodulation means operatively connected to the TRF receiver for demodulating the received signal, a first phase locked loop detector connected to the demodulation means for detecting the presence of the first tone in the demodulated signal and a second phase locked loop detector connected to the demodulation means for detecting the presence of the second tone in the demodulated signal.

7 Claims, 14 Drawing Figures

CURRENT CARRIER COMMUNICATION SYSTEM

BACKGROUND OF THE INVENTION

It is frequently necessary to transmit information within a building or building complex from a central location to a remote location and from a remote location to the central location. In the past, this information has normally been transmitted over a separate set of wires that are run throughout the building so that the information is transmitted directly from the central location to the remote location and vice versa. Such systems are commonly known as "hard wired" systems.

More recently, attempts have been made to transmit information from point to point within a building or building complex using the existing AC power lines already provided in the building to transmit the information. A number of different systems have been proposed for transmitting information over AC power lines. One such system that has been proposed is disclosed in U.S. Pat. No. 3,818,481 and is directed to a two-way communication system using AC power lines to transmit the information. Another such system that has been proposed is disclosed in U.S. Pat. No. 3,633,199 and is directed to an alarm system which transmits alarm signals over AC power lines. Another system that has been proposed is disclosed in U.S. Pat. No. 3,815,199 and is directed to a remote meter reading system which uses AC power lines. One of the problems commonly encountered with such systems is the lack of sufficient noise isolation within the system to preclude extraneous noise signals from the system. Another problem that is normally associated with such systems is that such systems are complex making them expensive to manufacture and costly to maintain. Another problem associated with such prior art systems is the lack of flexibility in transmitting information between points using the AC power line to satisfy the demand requirements of the information to be transmitted.

SUMMARY OF THE INVENTION

These and other problems and disadvantages associated with the prior art are overcome by the invention disclosed herein by the provision of a current carrier communication system using AC power lines in an AC power distribution network of a building or building complex to transmit discernable information between remote and central locations. The system of the invention employs noise rejection techniques to isolate any noise signals in the AC power distribution network from the information being transmitted. Further, the system is relatively simple in construction thereby reducing both the manufacturing cost and the operational cost thereof. The system of the invention is especially adapted to transmit and receive digital or binary information without adversely affecting the operation of equipment powered from the AC power distribution network. Because the information transmitted by the system is at low power, the signals transmitted are isolated from the community AC power distribution system outside of the building through the normal utility service transformer associated with each building or building complex.

The system includes at least first and second sources of binary electrical signals at a first location, a first tone generating means operatively connected to the first source of binary electrical signals for generating a first tone signal at a first frequency in response to the binary electrical signal from the first source of binary electrical signals, a second tone generating means operatively connected to the second source of binary electrical signals for generating a second tone signal at a second frequency in response to the binary electrical signal from the second source of binary electrical signals, linear tone summing means operatively connected to said first and second tone generating means for generating a modulating signal output that is a linear sum of the first and second tone signals, a source of RF signals operatively connected to the linear tone summing means to produce a modulated RF output signal modulated by the modulating signal output of the linear tone summing means, transmission coupling means at said first location directly coupling the modulated RF output signal to the AC power lines, receiver coupling means at the second location directly coupled to the AC power lines to receive the modulated RF output signal therefrom, a TRF multi-stage receiver means operatively connected to said receiver coupling means for receiving the modulated RF output signal therefrom and producing an amplified modulated RF output signal corresponding to the received modulated RF output signal, demodulation means operatively connected to the TRF receiver means for demodulating the amplified modulated RF output signal and producing a composite signal output corresponding in frequency to the linearly summed modulating signal output of the linear tone summing means, first phase locked loop detector means operatively connected to the demodulation means for detecting the presence of a tone in the composite signal output corresponding to the first tone signal from the first tone generating means and generating a first detected binary electrical signal output corresponding to the binary electrical signal from the first source of binary electrical signals, and second phase locked loop detector means operatively connected to the demodulation means for detecting the presence of a tone in the composite signal output corresponding to the second tone signal from the second tone generating means and generating a second detected binary electrical signal output corresponding to the binary electrical signal from the second source of binary electrical signals.

These and other features and advantages of the invention will become more apparent upon consideration of the following specification and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
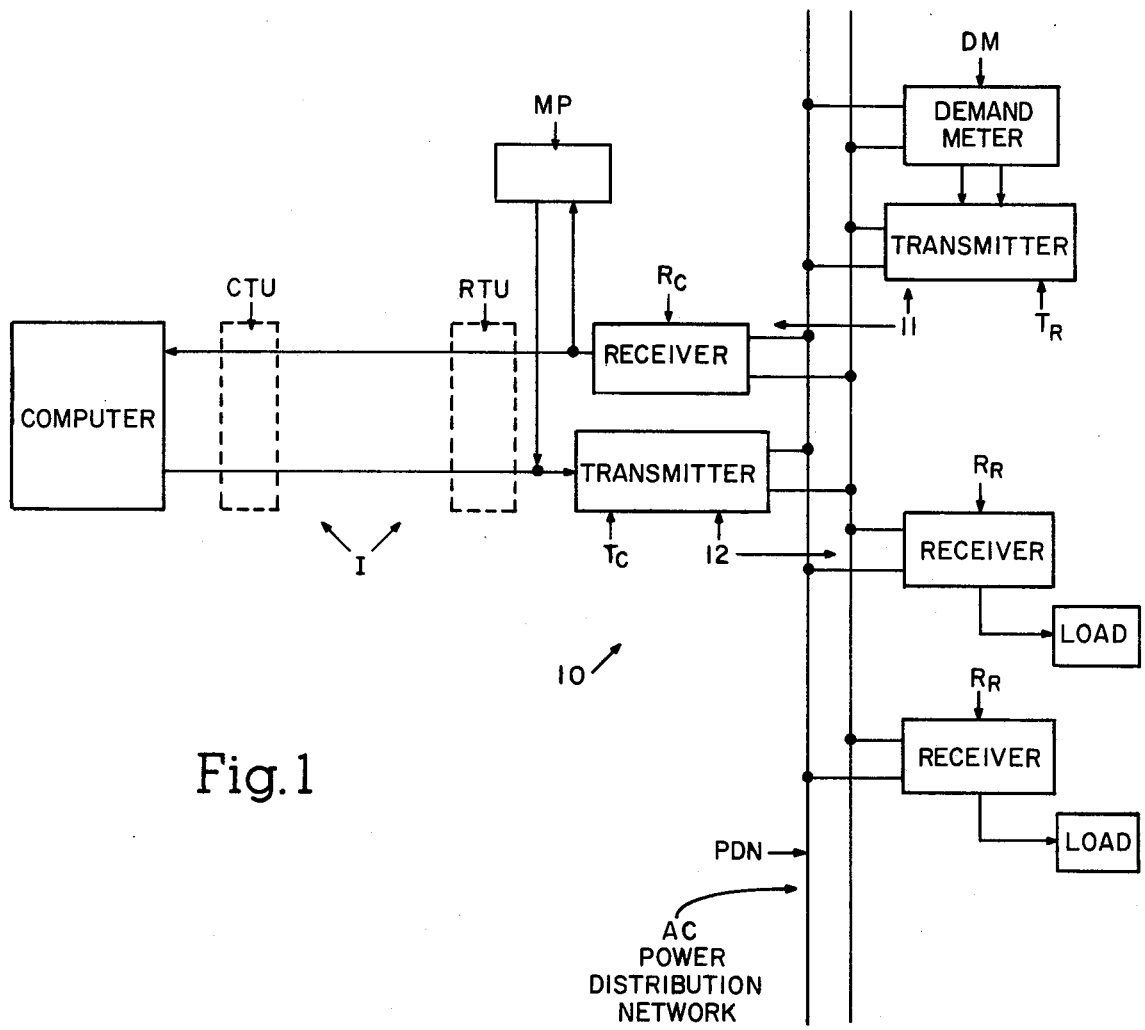
FIG. 1 is a general block diagram of the system of the invention.

While this invention may be used to transmit various information between points in a building or building complex, it is especially designed to transmit binary information to a computer and transmit binary control information from a computer. This is especially useful in energy monitoring systems which use a computer such as an IBM "System 7" computer that has been pre-programmed to establish electrical demand priority levels within a building or building complex and operates in response to changes in the electrical peak power demand in the building or building complex to control the operation of electrical loads and minimize the peak electrical power demand and thus minimize the power cost associated with the building. Referring to FIG. 1, it will be seen that the system 10 includes an input data collection link 11 and an output control link 12. The links 11 and 12 each use the conventional AC power distribution network PDN of a building to transmit and receive binary information between a central location CL and remote locations RL. The input data collection link 11 includes generally a remote transmitter $T_R$ located at a remote location RL within the building and a central receiver $R_C$ located at the central location CL in the building. Input information signals at the remote location RL are transmitted by the transmitter $T_R$ over the AC power distribution network PDN to the central receiver $R_C$. The output link 12 includes a central transmitter $T_C$ located at the central location CL and a remote receiver $R_R$ located at a remote location RL in the building. The central transmitter $T_C$ transmits information over the AC power distribution network PDN to the receiver $R_R$ at the remote location RL. In the system 10 illustrated in FIG. 1, the output of the central receiver $R_C$ is fed to a cental computer while the inputs to the central transmitter $T_C$ are received from the central computer. The central computer is conventional and may be an IBM System 7 or other similar computer programmed to establish electrical priority levels of the operating equipment in the building. In the particular system 10 illustrated, the input link 11 transmits the electrical demand information associated with one or more electrical demand meters DM to the central computer C while the output from the computer C is transmitted by the output link 12 to control electrical loads imposed on the AC power distribution network by the operating equipment in the building. If the central computer C is located at a remote position, and appropriate interface I shown by dotted lines in FIG. 1 may be used to connect the receiver $R_C$ and the transmitter $T_C$ to the computer C. Normally, the interface I would consist of a remote terminal unit RTU located in the building and comprising a modem and multiplexer to convert the digital binary output from the receiver $R_C$ into FSK binary and transmit this information over dedicated telephone lines to a central terminal unit located at the computer which re-converts the FSK binary signals into digital binary signals for acceptance by the computer. These same units would also convert the digital binary output from the computer to FSK binary and transmit same from the central terminal unit CTU over the dedicated telephone lines to the remote terminal unit RTU which re-converts the FSK binary into digital binary to control the transmitter $T_C$. Alternatively, the central computer system could be replaced by a mini-computer or microprocessor MP located within the building or the micro-processor MP could be used as a standby unit in the event of a breakdown of the communications link between the central location CL and the computer C.

INPUT DATA COLLECTION LINK

Figure 2:
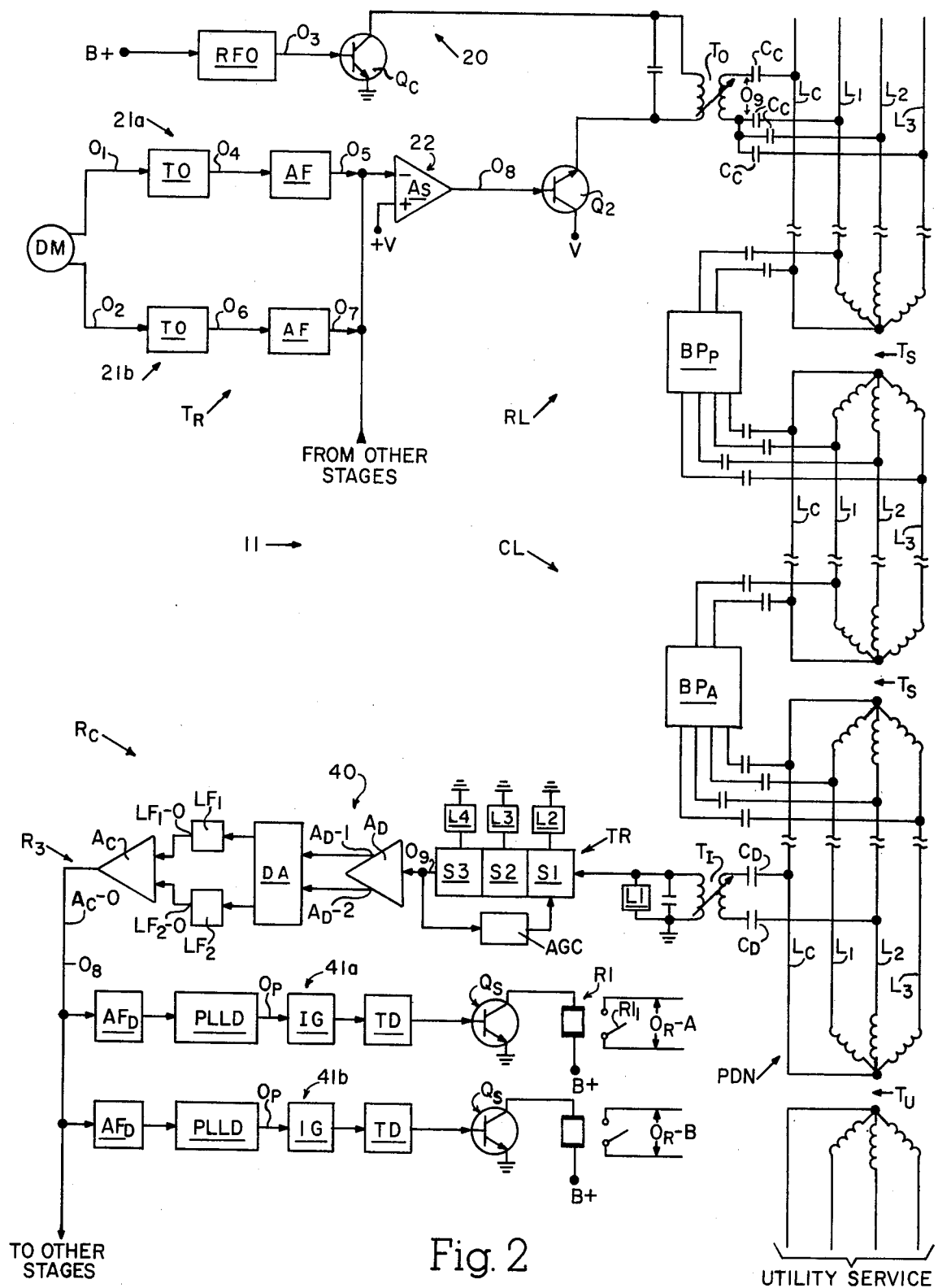
FIG. 2 is a block diagram illustrating the input link of the system.

The input data collection link 11 best seen in FIG. 2 serves to transfer binary input signals from a remote location RL to the central location CL over the AC power distribution network PDN of a building. The particular binary input signals transmitted by link 11 in FIG. 2 are from conventional electrical demand meters DM such as a peak reading recording demand meter commercially available from General Electric Company which usually generates two binary output signals $O_1$ and $O_2$ seen in FIG. 3 which has output signals representative of the electrical demand of the circuit to which it is connected. Usually the demand meters have a first binary signal output where the pulses are representative of the power being consumed by the circuit and a second binary signal output which sets up the time interval to monitor the pulse train from the first binary signal output. The link 11 transmits the binary outputs to the central computer which is designed to accept these binary signal outputs of the demand meters DM. In other words, the output of the demand meters DM could be hard wired directly into the computer for this function but link 11 eliminates the necessity of hard wiring the system by using the existing AC power distribution network PDN. The input link 11 comprises generally a remote transmitter $T_R$ at the remote location RL which connects the binary signal outputs of the demand meter DM to the AC power distribution network PDN in the vicinity of the demand meter DM and transmits an AM RF signal representative of the demand meter binary signal outputs into the AC power distribution network. The input link 11 further includes a central receiver $R_C$ which receives the AM signal transmitted through the AC power distribution network PDN, filters any noise from the signal and demodulates the signal to provide binary signal outputs to the central computer which correspond to the binary signal outputs of the demand meter. This allows the remote transmitter $T_R$ to be located in the vicinity of the demand meter DM and allows the receiver $R_C$ to be located in the vicinity of the computer as long as the AC power distribution network PDN is available at both positions.

Figure 3:
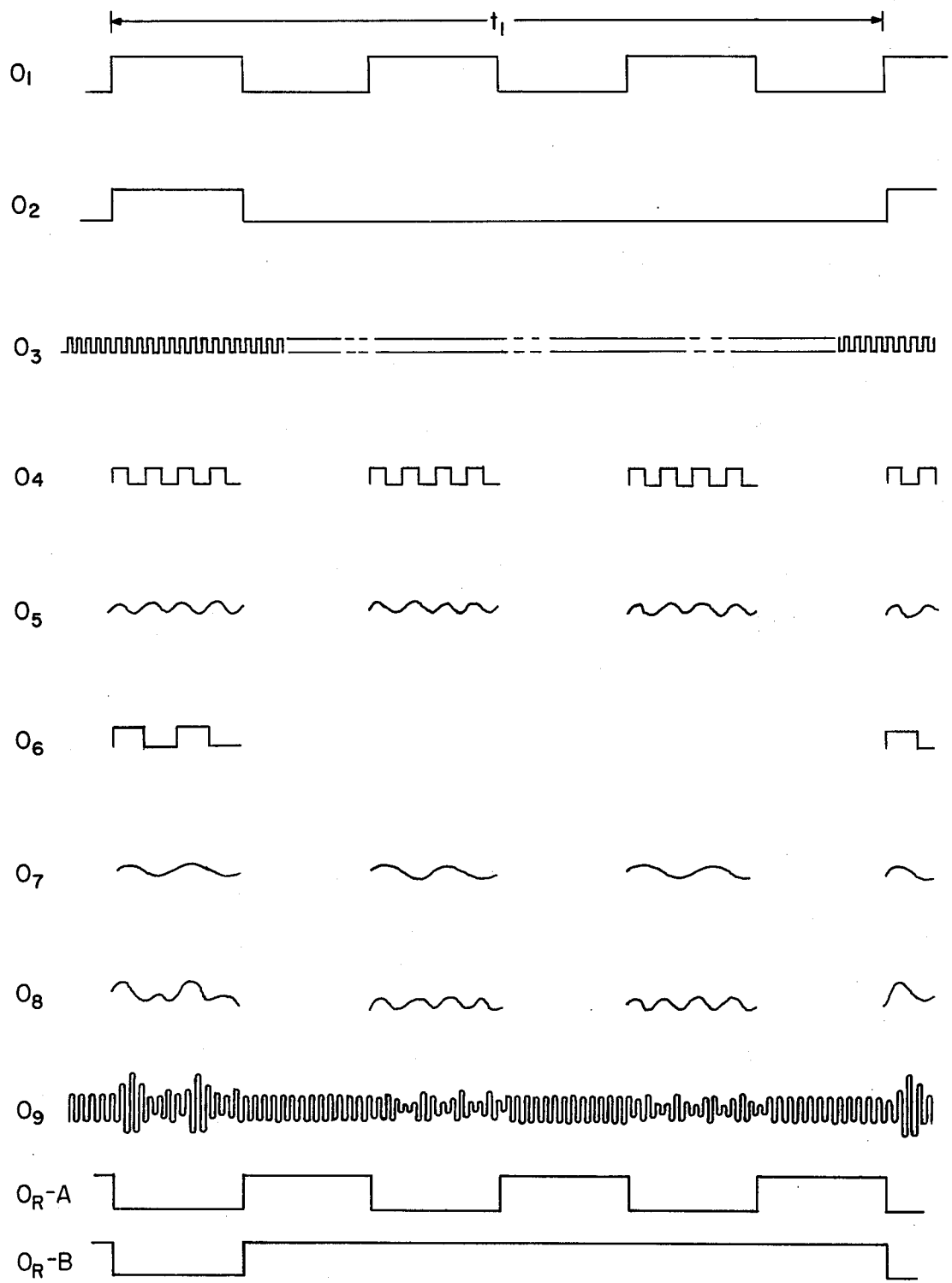
FIG. 3 is a signal diagram of the input link of the invention.

The remote transmitter $T_R$ seen in FIG. 2 comprises generally an R-F generator stage 20 which generates an R-F carrier signal $O_3$ as seen in FIG. 3, a plurality of tone generator stages 21, and a summing and modulating stage 22 which modulates the output of the R-F generator stage 20 to produce an AM signal output into the AC power distribution network PDN. Up to 16 tone generator stages 21 may be used in transmitter $T_R$, two being shown and designated $21_a$ and $21_b$ in FIG. 2, with stage $21_a$ having an output signal $O_5$ at frequency $f_1$ and with stage $21_b$ having an output signal $O_7$ at frequency $f_2$ as seen in FIG. 3. Each other tone generator stage 21, if used, would have a different frequency.

One R-F generator stage 20 and one summing stage 22 may be used with up to 16 tone generator stages 21 if that many different binary input signals are available in he vicinity of the transmitter $T_R$. The demand meter DM has two output signals $O_1$ and $O_2$ where signal $O_1$ is the power demand output signal of the demand meter which is indicative of the power being consumed and the interval output signal $O_2$ correlates the number of pulses in time interval $t_1$ for the signal $O_1$ for monitoring. Because there are two binary signal outputs from demand meter DM, the tone generator stage $21_a$ will be controlled by signal $O_1$ and tone generator stage $21_b$ will be controlled by signal $O_2$.

Each tone generator stage 21 uses basically the same components. Therefore, only stage $21_a$ will be described in detail with like reference numbers applied to stage $21_b$. The tone generator stage $21_a$ as seen in FIG. 2 includes a keyed tone oscillator TO which is keyed to its ON state by the signal $O_1$ and which generates the square wave output signal $O_4$ when it is turned ON. The tone signal $O_4$ passes through an active filter AF which filters the harmonics from signal $O_4$ and converts signal $O_4$ into a sine wave tone signal $O_5$ and this signal passes to the linear summing and modulating stage 22. It will be noted the tone signal outputs of each of the tone generator stages 21 are connected to the common input to the linear summing and modulating stage 22 so that they are linearly summed.

The R-F generating stage 20 seen in FIG. 2 includes a free running square wave oscillator RFO powered by the B+ voltage of a power supply (not shown) to continuously generate an unmodulated square wave R-F carrier output signal $O_3$ seen in FIG. 3 with R-F frequency $f_c$. The carrier signal $O_3$ is connected to the base of R-F amplifier transistor $Q_c$ whose collector is connected to the input coil of the tuned output transformer $T_O$.

The linear summing and modulating stage 22 seen in FIG. 2 includes a summing amplifier $A_s$ to which the signals $O_5$ and $O_7$ from stages $21_a$ and $21_b$ seen in FIG. 3 are connected. The summed output signal $O_8$ from amplifier $A_s$ is connected to the base of the modulating transistor $Q_M$. The emitter of transistor $Q_M$ is connected to the collector of transistor $Q_c$ through the input coil of output transformer $T_O$. Thus, the collector voltage on transistor $Q_c$ is a linear function of the emitter voltage on transistor $Q_M$ and, since transistor $Q_c$ is driven to saturation and cutoff by the oscillator RFO, the output signal $O_9$ from the output coil of transformer $T_O$ as seen in FIG. 3 is at the carrier frequency and amplitude modulated at the summed tone signal frequency.

The output coil of transformer $T_O$ is directly coupled to the power lines L of the AC power distribution network PDN through high voltage coupling capacitors $C_c$ as seen in FIG. 2. Usually, the output coil of transformer $T_O$ is connected to each phase of the network PDN. For sake of illustration, three phases are illustrated with common ground line $L_c$ and phase lines $L_1$–$L_3$. The signal $O_9$ is now injected into the network PDN.

Figure 4:
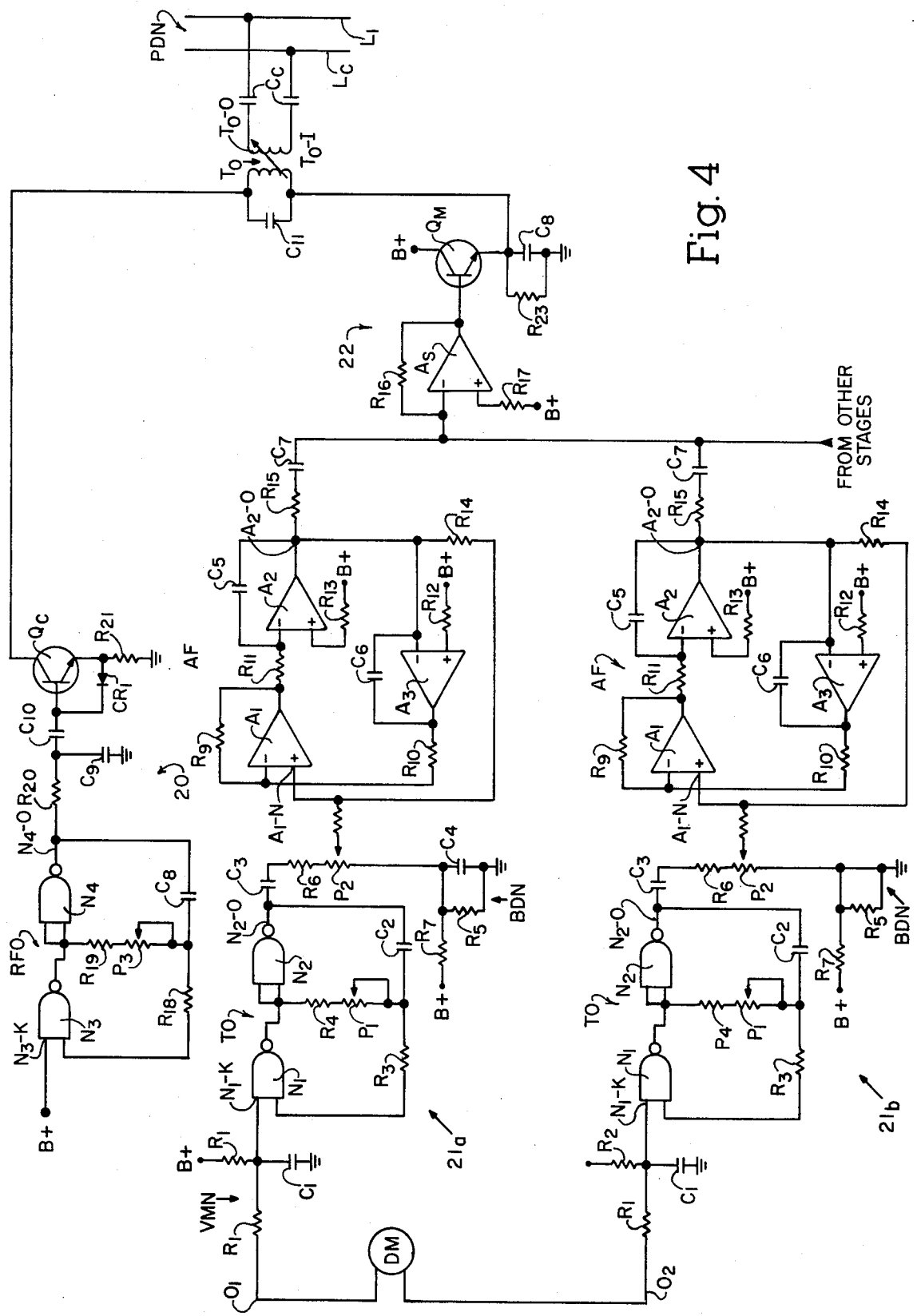
FIG. 4 is a schematic diagram of the transmitter of the input link.

A schematic of the circuit detail of transmitter $T_R$ satisfying the logic of the block diagram of FIG. 2 is illustrated in FIG. 4. The output signal $O_1$ of the demand meter DM is connected to the tone oscillator TO in the tone generator stage $21_a$ through a voltage matching network VMN of resistors $R_1$ and $R_2$ and capacitor $C_1$. The tone oscillator TO is a dual NAND gate keyed oscillator with NAND gates $N_1$ and $N_2$ connected by timing resistors $R_3$ and $R_4$, potentiometer $P_1$ and capacitor $C_2$. The keyed input $N_1$-K of gate $N_1$ is connected to the binary signal $O_1$ from the demand meter DM through the voltage matching network VMN. Thus, when the keyed input $N_1$-K is high, the oscillator TO will generate the square wave output signal $O_4$ at output $N_2$-O and will not generate the signal when the input $N_1$-K is low. The output of the oscillator TO is connected to the input of the active filter AF through a bias and decoupling network BDN including capacitors $C_3$ and $C_4$, resistors $R_5$–$R_8$ and potentiometer $P_2$. The active filter AF serves to remove the harmonics from the tone signal $O_4$ and filters the signal $O_4$ into a sine wave equivalent signal $O_5$. Filter AF is a bi-quad active filter comprising three dual input, internally compensated operational amplifiers $A_1$, $A_2$ and $A_3$ connected to each other through the RC network including resistors $R_9$–$R_{14}$ and capacitors $C_5$ and $C_6$. The non-inverting input $A_1$-N of amplifier $A_1$ is connected to the output of the bias and decoupling network BDN and serves as the input of the filter. The filter AF converts the square wave input $O_4$ into an equivalent sine wave output $O_5$ at the output $A_2$-O of the filter AF which is the output of the amlifier $A_2$. The signal $O_5$ is then connected to the input of the linear summing and modulating stage 22 through coupling resistor $R_{15}$ and coupling capacitor $C_7$. The stage $21_B$ has the same components as the stage $21_a$ except that the tone oscillator TO in stage $21_b$ is tuned to a different frequency than the stage $21_a$. The tone oscillators TO are normally tuned to have an output frequency in the 100 Hz to 1800 Hz range.

The carrier oscillator RFO is also a dual NAND gate oscillator with NAND gates $N_3$ and $N_4$ interconnected by the RC network including resistor $R_{18}$ and $R_{19}$, capacitor $C_8$ and potentiometer $P_3$. The keyed input $N_3$-K of NAND gate $N_3$ is tied to the B+ voltage so that it is a free running oscillator and operates continuously. The square wave carrier signal $O_3$ is generated at output $N_4$-O of oscillator RFO and is in the R-F frequency range. The particular oscillator RFO illustrated generates a 200 KHz signal. The output signal $O_3$ is connected through a passive low pass filter including resistor $R_{20}$ and capacitor $C_9$ to the base of the NPN output transistor $Q_C$ through the coupling and bias network including resistor $R_{21}$, capacitor $C_{10}$ and diode $CR_1$. The collector of transistor $Q_C$ is connected to one side of the input coil $T_O$-I of the tuned output transformer $T_o$ with a coupling capacitor $C_{11}$ thereacross.

The linear summing and modulating stage 22 includes the summing amplifier $A_s$ which is a dual input, internally compensated operational amplifier with its non-inverting input connected to the B+ voltage through resistor $R_{17}$ and its inverting input $A_s$-I connected to the output $A_2$-O of filter AF through resistor $R_{15}$ and capacitor $C_7$. Biasing resistor $R_{16}$ is connected across amplifier $A_s$ and the output $A_3$-O of amplifier $A_s$ is connected to the base of the NPN modulating transistor $Q_M$. The collector of transistor $Q_M$ is connected to the B+ voltage and the emitter is connected to the input coil $T_O$-I of transformer $T_O$ through the biasing network including resistor $R_{23}$ and capacitor $C_8$. This causes the output coil $T_O$-O of the transformer $T_O$ to generate the output AM signal $O_9$ as seen in FIG. 3 to the network PDN. It will further be noted that all of the tone generating stages 21 are connected to the input $A_s$-I of the amplifier $A_s$ so that the amplifier $A_s$ linearly sums all of the tone signals such as tone signals $O_5$ and $O_7$ to produce the linearly summed signal $O_8$ at the output $A_s$-O of the amplifier $A_s$.

Most AC power distribution networks in a building are connected to the associated public utility system by a utility service transformer $T_u$ as seen in FIG. 2. Because most of the signal energy transmitted and received by system 10 is conductive, the reactive impedance of such transformers serves to block transmission of the signals through the transformer and thus isolate the signals to the building housing system 10.

Figure 5:
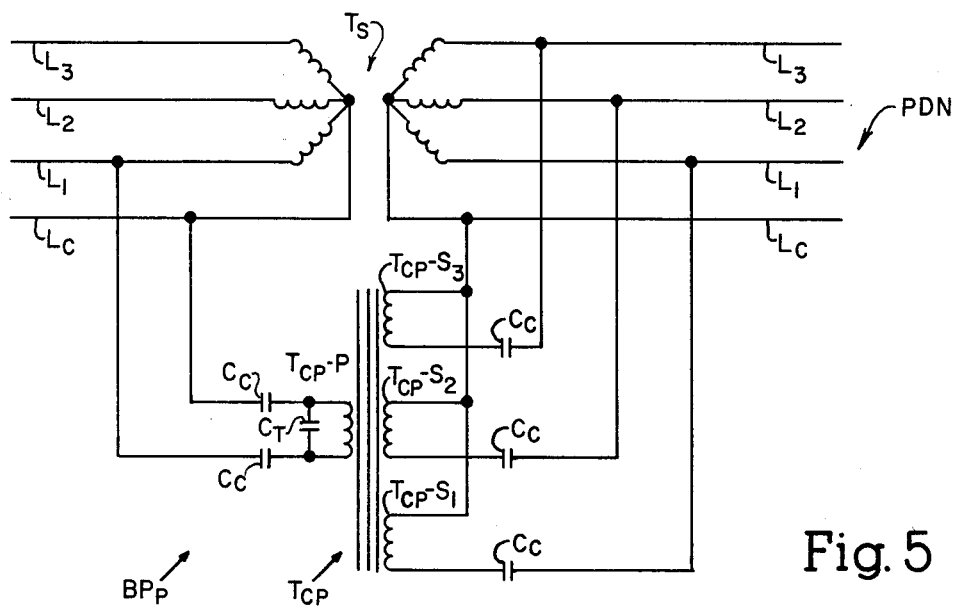
FIG. 5 is a schematic diagram of the passive by-pass unit.

Sometimes service transformers $T_s$ are used in the power distribution network PDN within the building as seen in FIG. 2. This requires a by-pass unit BP to transfer the signals of system 10 across such transformers $T_s$. Such by-pass units may be either passive (unit $BP_P$) or active (unit $BP_A$) as seen in FIG. 2. FIG. 5 is a schematic illustrating the passive by-pass unit $BP_P$ and FIG. 6 is a schematic illustrating the active by-pass unit $BP_A$.

The passive by-pass unit $BP_P$ in FIG. 5 includes a coupling R-F transformer $T_{CP}$ having its primary winding $T_{CP}$-P connected to one phase of the power distribution network PDN, here shown as lines $L_c$ and $L_1$ through high voltage coupling capacitors $C_c$ so that the incoming AM signals $O_9$ on lines $L_c$ and $L_1$ are injected into winding $T_{CP}$-P. Tuning capacitor $C_T$ may be used to tune transformer $T_{CP}$. Each secondary winding $T_{CP}$-$S_1$; $T_{CP}$-$S_2$ and $T_{CP}$-$S_3$ is connected to one phase of the opposite side of transformer $T_s$ from the incoming signal $O_9$ by high voltage coupling capacitors $C_c$. Thus, signal $O_9$ is removed from one side of transformer $T_s$ and reinjected on the opposite side of transformer $T_s$. Unit $BP_P$ provides impedance matching, ground noise isolation, common mode noise isolation and is tuned to signal $O_9$.

Figure 6:
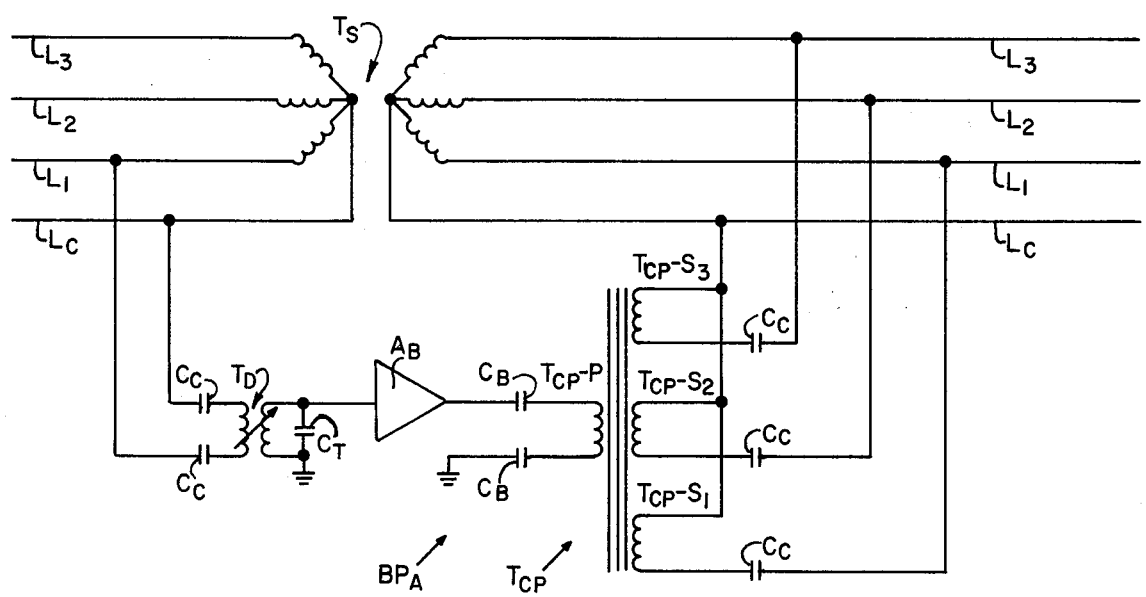
FIG. 6 is a schematic diagram of the active by-pass unit.

When it is desirable to also amplify signal $O_9$ as transformer $T_s$ is by-passed, the active unit $BP_A$ is used as seen in FIG. 6. The unit $BP_A$ includes a tuned R-F transformer $T_D$ that has its input winding connected to one phase of the power distribution network PDN carrying signal $O_9$ through coupling capacitors $C_c$. The output winding of transformer $T_D$ with tuning capacitor $C_T$ thereacross is connected to the input of an operational amplifier $A_B$. The output of amplifier $A_B$ is connected to the primary winding $T_{CP}$-P of the coupling R-F transformer $T_{CP}$ by coupling capacitors $C_B$. Each secondary winding $T_{CP}$-$S_1$; $T_{CP}$-$S_2$ and $T_{CP}$-$S_3$ is connected to one phase of the opposite side of transformer $T_s$ from the incoming signal $O_9$ by high voltage coupling capacitors $C_c$. Thus, signal $O_9$ is removed from one side of transformer $T_s$, amplified, and reinjected on the opposite side of transformer $T_s$. Unit $BP_A$, like unit $BP_P$, provides impedance matching, ground noise isolation, common mode noise isolation and is tuned to signal $O_9$.

The receiver $R_C$ in link 11 located at the central location in the building is coupled to the AC power distribution network PDN and produces binary outputs corresponding to the binary inputs to transmitter $T_R$. Receiver $R_C$ seen in FIG. 2 includes a receiver stage 40 and a plurality of tone decoder stages 41, two of which are shown and labelled $41_a$ and $41_b$. Decoder stage $41_a$ is tuned to signal $O_5$ while decoder stage $41_b$ is tuned to signal $O_7$. The receiver stage 40 is coupled to the AC power distribution network PDN through the decoupling capacitors $C_D$ and input transformer $T_I$ so that the AM signal $O_9$ will be received. Stage 20 includes a noise limiter L1 connected across the output winding of input transformer $T_1$ to prevent large noise spikes from destroying the receiver stage 40. The input of a three stage TRF receiver TR is connected to the output winding of transformer $T_I$ to receive and amplify signal $O_9$ in the amplification stages S1, S2 and S3. Interstage noise limiters L2, L3 and L4 are connected to stages S1, S2 and S3 respectively to further attenuate any noise imposed on signal $O_9$. Automatic gain control AGC is also provided for receiver TR. The output of receiver TR is connected to the input of a differential amplifier $A_D$ to generate a first output $A_D$-1 corresponding directly to signal $O_9$ and a second output $A_D$-2 corresponding to signal $O_9$ with a 180° phase shift. The outputs $A_D$-1 and $A_D$-2 are connected to the dual inputs of a demodulator $D_A$ which demodulates the output $A_D$-1 to output $D_A$-1 and demodulates the output $A_D$-2 to output $D_A$-2. The output $D_A$-1 is connected to a low-pass filter $LF_1$ and output $D_A$-2 is connected to low-pass filter $LF_2$. The output $LF_1$-O of filter $LF_1$ corresponds to the summed tone signal $O_8$ while the output $LF_2$-O of filter $LF_2$ corresponds to signal $O_8$ with a 180° phase shift. The outputs $LF_1$-O and $LF_2$-O are connected to the inputs of a dual input amplifier $A_C$ which recombines inputs $LF_1$-O and $LF_2$-O into output $A_C$-O corresponding to signal $O_8$ with any even order distortion cancelled.

The output $A_C$-O is connected to each of the tone decode stages 41. With decoder stage $41_a$ tuned to signal $O_5$, the output $A_C$-O is connected to a decode active filter $AF_D$ which allows signal $O_5$ in output $A_C$-O to pass from output $AF_D$-O to the input of a phase locked loop tone detector PLLD. This produces an output $O_P$ from detector PLLD which corresponds to signal $O_1$. The output $O_P$ is connected to an integrator IG to generate an integrated output signal $O_I$ to threshhold detector TD. The output $O_D$ of threshhold detector $O_D$ is connected to the base of a switching transistor $Q_s$ that drives relay R1. The output $O_R$-A from switch contacts $R1_1$ of relay R1 reproduces the input signal $O_1$. Similarly, the output OR-B from relay R1 in decoder stage $41_b$ reproduces input signal $O_2$.

Figure 7:
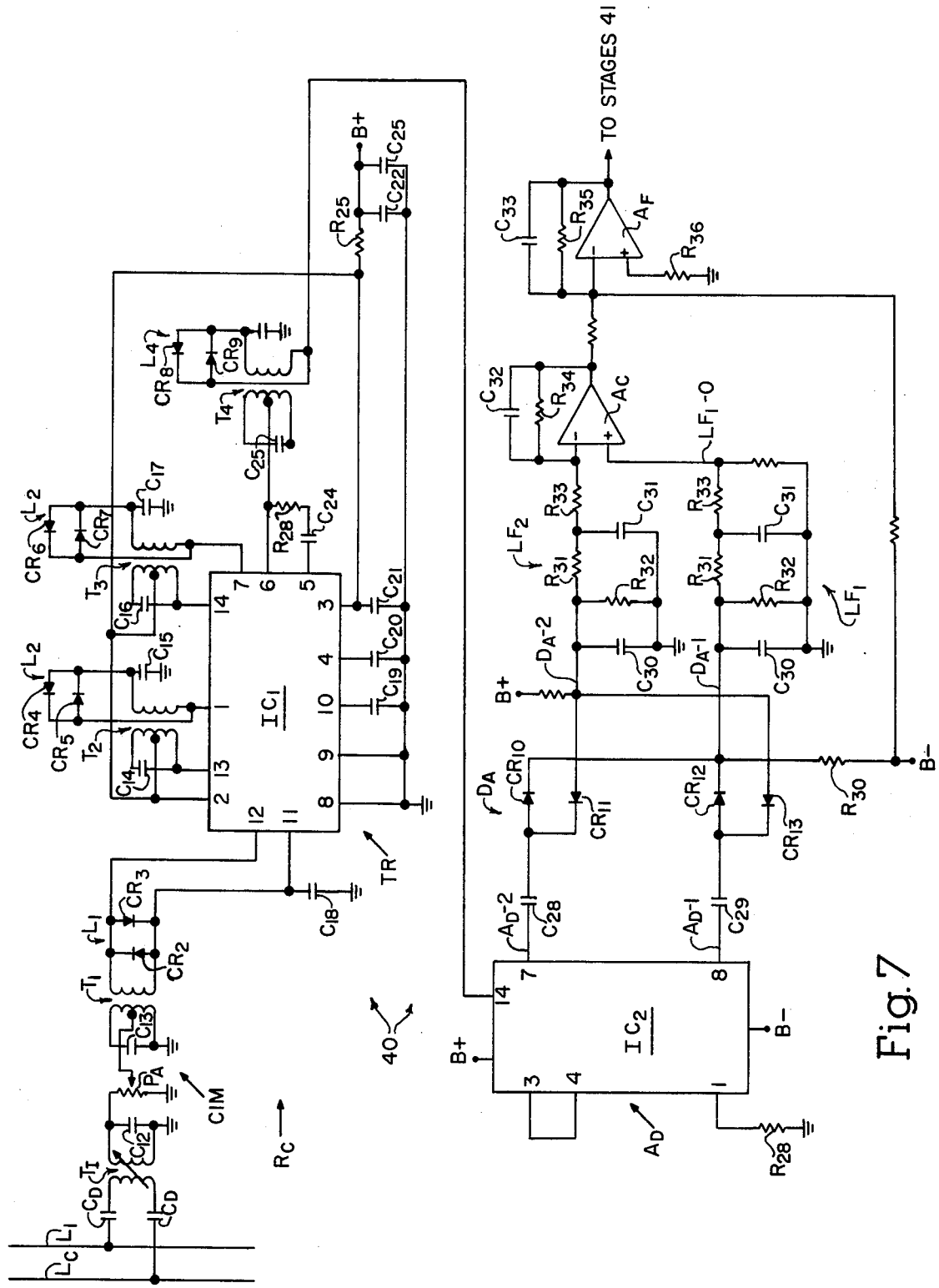
FIG. 7 is a schematic diagram of the receiver stage of the receiver of the input link.
Figure 8:
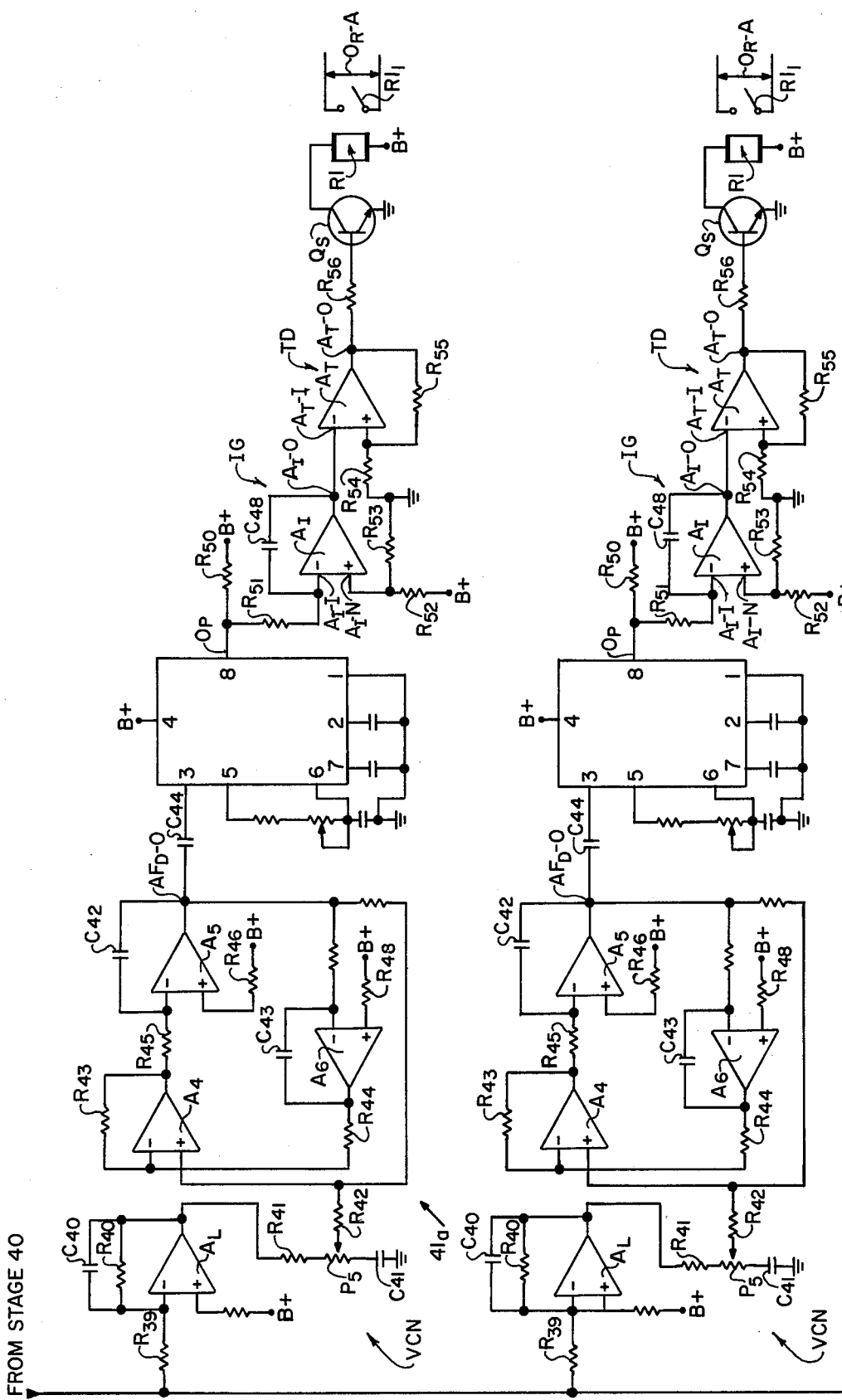
FIG. 8 is a schematic diagram of the tone decode stage of the receiver of the input link.

The circuit schematic illustrated in FIG. 7 satisfies the logic diagram for the receiver stage 40 in FIG. 2 and the circuit diagram in FIG. 8 satisfies the logic diagram for the tone decoder stages $41_a$ and $41_b$ in FIG. 2. As soon in FIG. 7, the output winding $T_o$-O of the decoupling transformer $T_D$ with capacitor $C_{12}$ thereacross is connected to a coupling and impedance matching network CIM including potentiometer $P_4$, capacitor $C_{13}$ and transformer $T_1$. The limiter L1 is a dual diode type limiter comprising diodes $CR_2$ and $CR_3$ in parallel across the output of transformer $T_1$.

The receiver TR is an integrated circuit $IC_1$ available from Fairchild Semiconductor under their product designation UA720. The circuit $IC_1$ is wired as a TRF receiver. The RF input pin No. 12 and the RF input pin No. 12 and the RF decouple pin No. 11 are connected to the output of transformer $T_1$. The oscillator input pin No. 2 is connected to the B+ voltage supply. First stage tuning transformer $T_2$ is connected between the RF output pin No. 13 and the converter input pin No. 1 with capacitor $C_{14}$ across the winding of transformer $T_2$ connected to pin No. 13 and with the winding connected to pin No. 1 connected to ground through capacitor $C_{13}$. The limiter L2 is connected across the winding of transformer $T_2$ connected to pin No. 1 and comprises diodes $CR_4$ and $CR_5$. The second stage tuning transformer $T_3$ is connected between the converter output pin No. 14 and the IF input pin No. 7. Capacitor $C_{16}$ is connected across the winding of transformer $T_3$ connected to pin No. 14 and the winding connected to pin No. 7 is connected to ground through capacitor $C_{17}$. The winding of transformer $T_3$ connected to pin No. 7 also has the limiter L3 connected thereacross comprising diodes $CR_6$ and $CR_7$. The RF detector pin No. 11 is also connected to ground through capacitor $C_{18}$, while both ground pin Nos. 8 and 9 are connected to ground. The AGC filter pin No. 10 is connected to ground through capacitor $C_{19}$ while the converter decouple pin No. 14 is connected to ground through capacitor $C_{20}$. The voltage supply network from the B+ voltage source is connected to pin No. 3 through capacitors $C_{21}$–$C_{23}$ and resistor $R_{25}$. The AGC detector input pin No. 5 is coupled to IF output pin No. 6 through capacitor $C_{24}$ and resistor $R_{26}$. The output transformer $T_4$ is connected to pin No. 6 with capacitor $C_{25}$ connected across the input winding. The double diode limiter L4 is connected across the output winding of transformer $T_4$ and comprises diodes $CR_8$ and $CR_9$. The output of transformer $T_4$ is connected to the input of the differential amplifier $A_D$.

The particular differential amplifier $A_D$ used is a two stage, differential input, differential output, wide-band video amplifier integrated circuit $IC_2$ commercially available as No. LM 733 from National Semiconductor Corporation. The output of transformer $T_4$ is connected to the input pin No. 14 of circuit $IC_2$ with the gain select pin Nos. 3 and 4 directly connected. The voltage input pin No. 10 is connected to the B+ voltage and the voltage input pin No. 5 is connected to the B− voltage. The other input pin No. 1 is connected to ground through resistor $R_{28}$. Output pin No. generates the output $A_D$-1 and the output pin No. 7 generates the output $A_D$-2 with each of these outputs connected to the inputs of the demodulator $D_A$ through coupling capacitors $C_{28}$ and $C_{29}$.

The demodulator $D_A$ is a balanced demodulator comprising diodes $CR_{10}$–$CR_{13}$ and resistors $R_{29}$ and $R_{30}$. The output $D_A$-1 is connected to the low pass filter $LF_1$ comprising resistors $R_{31}$–$R_{33}$ and capacitors $C_{30}$ and $C_{31}$. The output $D_A$-2 is connected to the low pass filter $LF_2$ with like resistors $R_{31}$–$R_{33}$ and capacitors $C_{30}$ and $C_{31}$. The amplifier $A_C$ is a dual input single output operational amplifier. The filter output $LF_1$-O is connected to the non-inverted input of amplifier $A_C$ while the filter output $LF_2$-O is connected to the inverted output of the amplifier $A_C$. The amplifier has a biasing circuit comprising capacitor $C_{32}$ and resistor $R_{34}$ between the inverting input and the output thereof. The output $A_C$-O may be connected through an active filter comprised of amplifier $A_F$ biased by resistor $R_{35}$ and capacitor $C_{33}$ where the non-inverting input to amplifiers $A_F$ is grounded through resistor $R_{36}$.

Referring to FIG. 8, the output of the amplifier $A_F$ is connected to each of the tone decoder stages 41. Since each of the tone decoder stages 41 contains the same components, only stage $41_a$ will be described in detail with like references being applied to the other stages. The output from the amplifier $A_F$ is received by a low pass active filter comprising amplifier $A_L$ with its non-inverting input connected to the B+ voltage through resistor $R_{38}$ and the output of the amplifier $A_F$ connected to the inverting input of the amplifier $A_L$ through coupling resistor $R_{39}$. The inverting input to amplifier $A_L$ is connected to its output by the biasing network comprised of resistor $R_{40}$ and capacitor $C_{40}$. The output of the amplifier $A_L$ is connected to a voltage coupling network VCN comprising resistors $R_{41}$ and $R_{42}$, potentiometer $P_5$ and capacitor $C_{41}$.

Filter $AF_D$ is a bi-quad active filter comprising three dual input, internally compensated operational amplifiers $A_4$, $A_5$ and $A_6$ connected to each other through the RC network including resistors $R_{43}$–$R_{48}$ and capacitors $C_{42}$ and $C_{43}$. The non-inverting input $A_4$-N of amplifier $A_4$ is connected to the output of the voltage coupling network VCN and serves as the input of the filter. The filter $AF_D$ provides gross filtering to the output Ahd c-O from receiver stage 40 to generally allow signal $O_5$ present in output $A_c$-O to pass from output $AF_D$-O.

The phase locked loop detector PLLD is commercially available from National Semiconductor as their product No. LM567. The input pin No. 3 is connected to output $AF_D$-O through coupling capacitor $C_{44}$. Timing for pin Nos. 5 and 6 is provided by resistor $R_{49}$, potentiometer $P_6$ and capacitor $C_{45}$. Filtering to pin Nos. 1 and 2 is provided by capacitors $C_{46}$ and $C_{47}$. The output $O_P$ from pin No. 8 is biased high through resistor $R_{50}$ to the B+ voltage when no tone signal $O_5$ is present and is biased low when tone signal $O_5$ is present.

The output $O_P$ is connected to the integrator IG comprising dual input amplifier $A_I$ with its inverting input $A_I$-I connected to pin No. 8 on the decoder PPLD through resistor $R_{51}$. The non-inverting input $A_I$-N connected to the B+ voltage through the voltage divider network with resistors $R_{52}$ and $R_{53}$. The output $A_1$-0 is coupled to input $A_I$-I by capacitor $C_{48}$.

Threshhold detector TD comprises a dual input amplifier $A_T$ with its inverting input $A_T$-I connected to output $A_I$-O so that signal $O_P$ controls amplifier $A_T$. The non-inverting input of amplifier $A_T$ is grounded through resistor $R_{54}$ and its output $A_T$-O is connected to the non-inverting input by resistor $R_{55}$. The output $A_T$-O is connected to the base of the NPN switching transistor $Q_S$ through resistor $R_{56}$ so that when the integrator IG integrates up to the threshhold level of detector $TD_1$ the output $A_T$-O goes low to cause transistor $Q_S$ to conduct and close contacts $RI_1$ so that output $O_R$-A matches signal $O_1$.

OUTPUT CONTROL LINK

Figure 9:
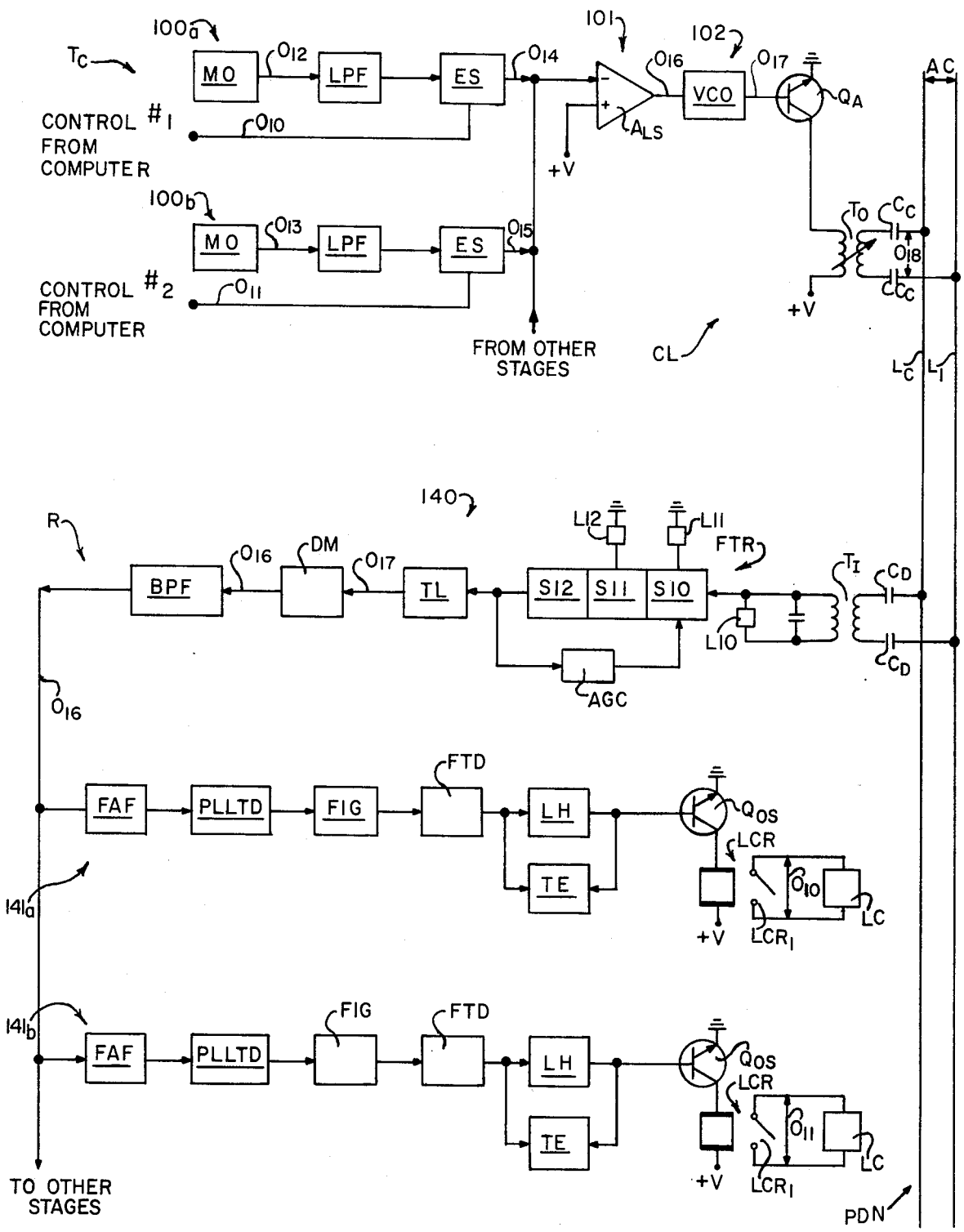
FIG. 9 is a block diagram illustrating the output link of the system.

The output control link 12 best seen in FIG. 9 serves to transfer binary input signals from the central locaton CL to a remote location RL over the AC power distribution network PDN of the building. The particular binary input signals transmitted by link 12 in FIG. 9 are from a control computer such as an IBM System 7 which produces binary control outputs such as outputs $O_{10}$ and $O_{11}$ seen in FIG. 10. The link 12 transmits the binary outputs to a load controller LC designed to accept these binary signal outputs of the computer to control the operation of equipment in the building.

The output link 12 comprises generally a central transmitter $T_C$ at the central location CL which connects the binary signal outputs of the computer to the AC power distribution network PDN in the vicinity of the computer and transmits an FM RF signal representative of the computer binary signal outputs into the AC power distribution network. The output link 12 further includes one or more receivers $R_R$ which receive the FM signal transmitted through the AC power distribution network PDN, filters any noise from the signal, and demodulates the signal to provides binary signal outputs to the load controllers LC which correspond to the binary signal outputs of the computer. This allows the central transmitter $T_C$ to be located in the vicinity of the computer and the receivers $R_R$ to be located in the vicinity of the load controllers as long as the AC power distribution network PDN is available at both locations.

Figure 10:
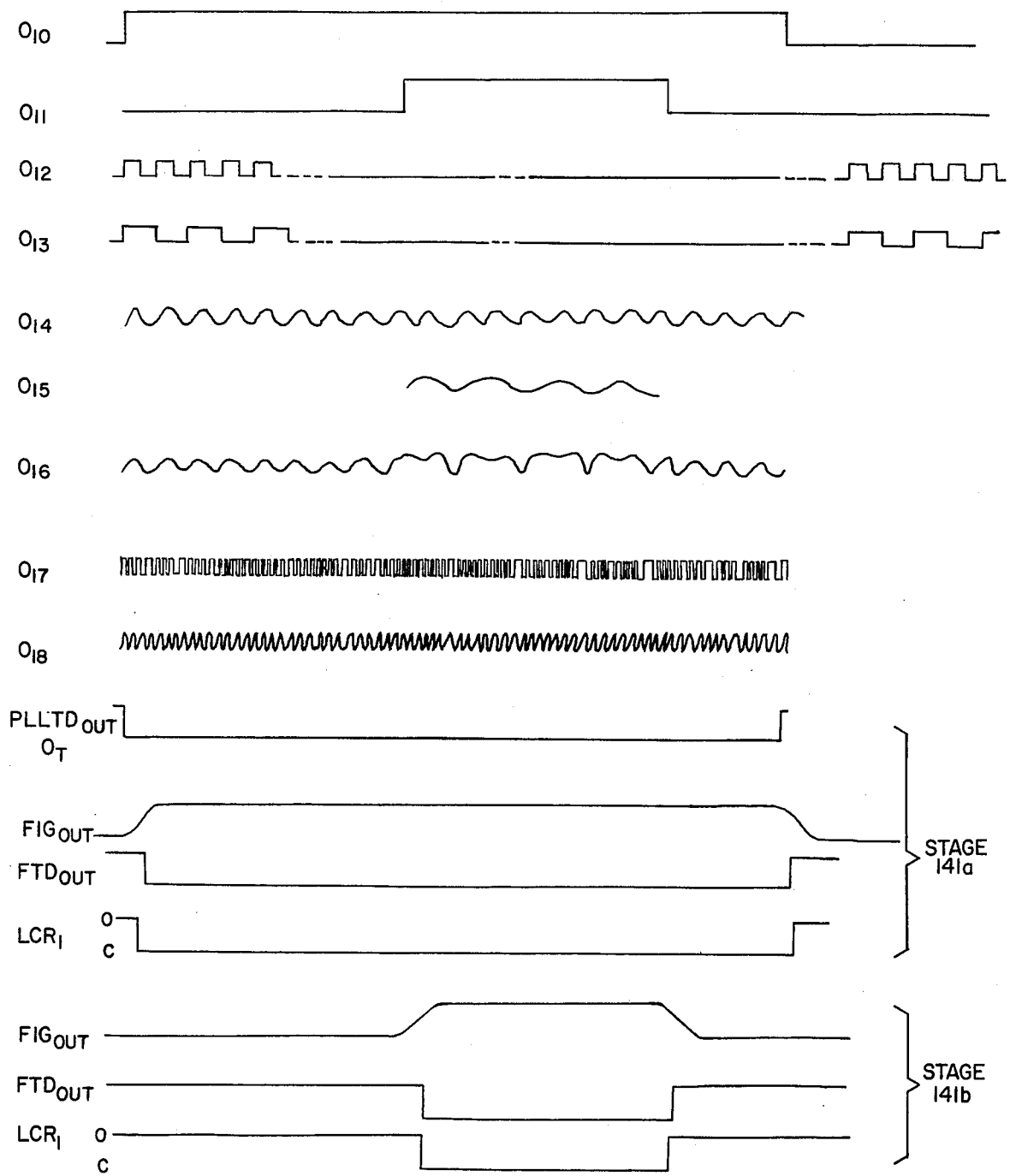
FIG. 10 is a signal diagram of the output link of the invention.

The central transmitter $T_C$ comprises a plurality of tone generator stages 100, a summing and modulating stage 101 and an R-F generator stage 102 where the stage 101 modulates the output of stage 102 to produce an FM signal output into the AC power distribution network PDN. Up to 16 tone generator stages 100 may be used in transmitter $T_C$, two being shown and designated $100_a$ and $100_b$ in FIG. 9, with stage $100_a$ having an output signal $O_{12}$ at frequency $f_1$ and with stage $100_b$ having an output signal $O_{13}$ at frequency $f_2$ as seen in FIG. 10. Each other tone generator stage 100 used would have a different frequency. One R-F generator stage 102 and one summing stage 101 may be used with up to 16 tone generator stages 100 if that many different binary input signals are available in the vicinity of the transmitter $T_C$. Two of the computer output signals $O_{10}$ and $O_{11}$ are shown where the tone generator stage $100_a$ is controlled by signal $O_{10}$ and tone generator stage $100_b$ is controlled by signal $O_{11}$.

Each tone generator stage 100 uses basically the same components. Therefore, only stage $100_a$ will be described in detail with like reference numbers applied to stage $100_b$. The tone generator stage $100_a$ as seen in FIG. 9 includes a free running oscillator MO which continuously generates the square wave output signal $O_{12}$. The tone signal $O_{12}$ passes through a low pass active filter LPF which filters the harmonics from signal $O_{12}$ and converts signal $O_{12}$ into its sine wave equivalent. The output of filter LPF is connected to the linear summing and modulating stage 101 through an electronic switch ES which conducts in response to the output signal $O_{10}$ from the computer. Thus, when signal $O_{10}$ is high, switch ES supplies signal $O_{14}$ stage 101. It will be noted that the tone signal outputs of each of the tone generator stages 100 are connected to the common input to the linear summing and modulating stage 101 so that they are linearly summed.

The linear summing and modulating stage 101 seen in FIG. 9 inches a linear summing amplifier $A_{LS}$ to which the signals $O_{14}$ and $O_{15}$ from stages $100_a$ and $100_b$ seen in FIG. 10 are connected. This produces the summed output signal $O_{16}$ from amplifier $A_{LS}$. The R-F generating stage 102 seen in FIG. 9 includes a voltage controlled VCO continuously generating a square wave R-F carrier output signal with a center R-F frequency $f_r$. The output signal $O_{16}$ from stage 101 is connected to the input of oscillator VCO to cause the oscillator VCO to generate a square wave FM modulated carrier signal $O_{17}$. The carrier signal $O_{17}$ is connected to the base of R-F amplifier transistor $Q_4$ whose collector is connected to the input coil of the tuned output transformer $T_O$. This causes the output coil of transformer $T_O$ to generate signal $O_{18}$ in FIG. 10.

The output coil of transformer $T_O$ is directly coupled to the power lines L of the AC power distribution network PDN through high voltage coupling capacitors $C_c$ as seen in FIG. 9. Usually, the output coil of transformer $T_O$ is connected to each phase of the network PDN. For sake of illustration, only one phase is illustrated with common ground line $L_c$ and phase line $L_1$.

The signal $O_{18}$ is now injected into the network PDN.

Figure 11:
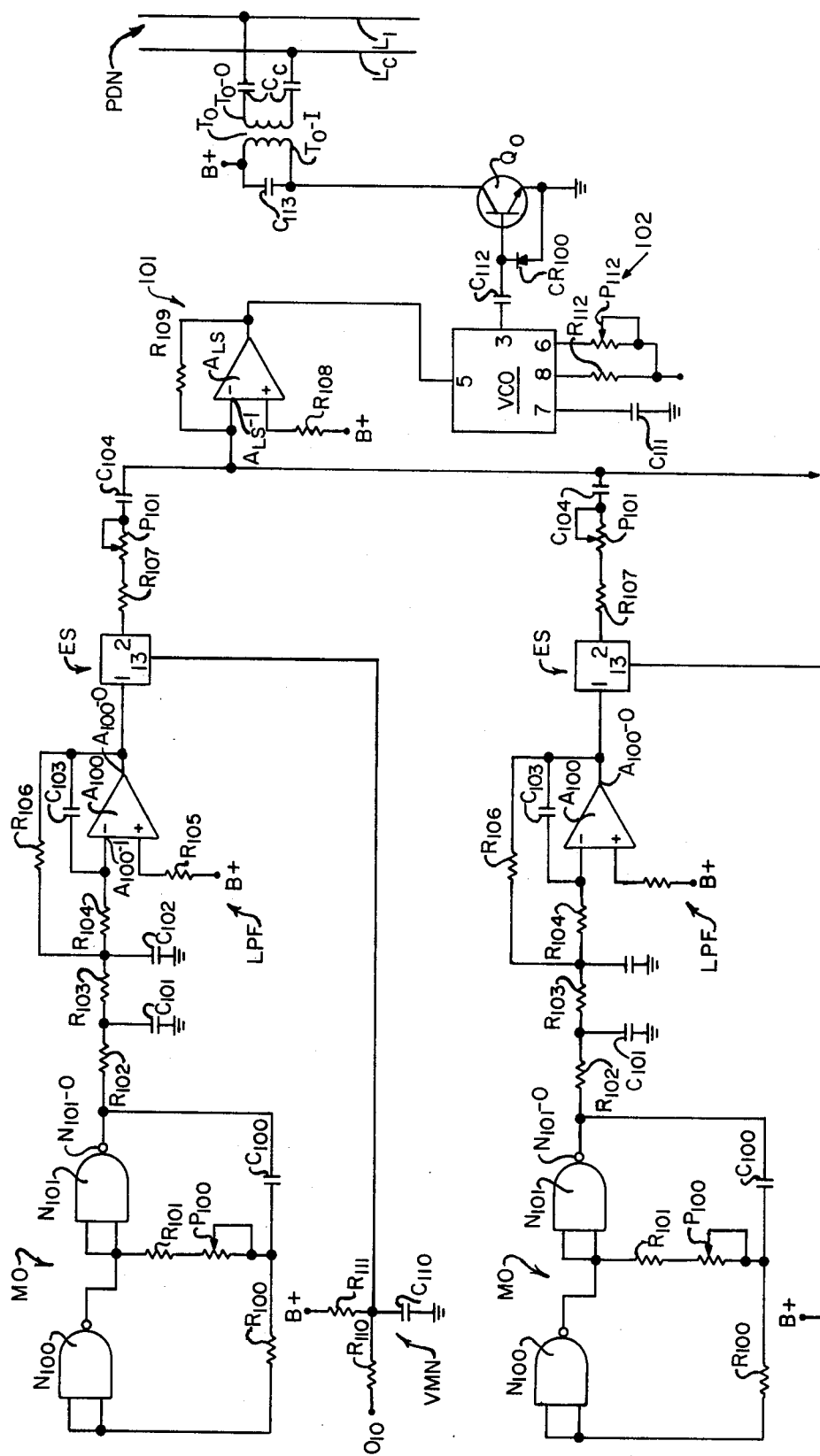
FIG. 11 is a schematic diagram of the transmitter of the output link.

A schematic of the circuit detail of transmitter $T_C$ satisfying the logic of the block diagram of FIG. 9 is illustrated in FIG. 11. The output signal $O_{10}$ of the computer is connected to the electronic switch ES in the tone generator stage $100_a$ through a voltage matching network VMN of resistors $R_{110}$ and $R_{111}$ and capacitor $C_{110}$. The tone oscillator MO is a dual NAND gate astable multivibrator with NAND gates $N_{100}$ and $N_{101}$ connected to timing resistors $R_{100}$ and $R_{101}$, potentiometer $P_{100}$ and capacitor $C_{100}$. Thus, the oscillator MO will continuously generate the square wave output signal $O_{12}$ at output $N_{101}$-0. The output of the oscillator MO is connected to the input of the active filter LPF. The active filter LPF serves to remove the harmonics from the tone signal $O_{12}$ and filters the signal $O_{12}$ into a sine wave equivalent signal. Filter LPF has a passive section comprising resistor $R_{102}$ and capacitor $C_{101}$, and an active section comprising a dual input, internally compensated operational amplifier $A_{100}$ with RC network including resistors $R_{103}$—$R_{106}$ and capacitors $C_{102}$ and $C_{103}$. The inverting input $A_{100}$-I of amplifier $A_{100}$ is connected to the output of the oscillator MO. The filter LPF converts the square wave input $O_{12}$ into an equivalent sine wave output at the output $A_{100}$-O of the filter LPF. The switch ES is a bilaterial COS/MOS switch available from RCA as their product No. CD4016. The input is connected to output $A_{100}$-O and the control input is connected to signal $O_{10}$ through network VMN. The signal $O_{14}$ is produced at the output of switch ES and connected to the input of the summing stage 101 through resistor $R_{107}$, potentiometer $P_{101}$ and capacitor $C_{104}$. The stage $100_b$ has the same components as the stage $100_a$ except that the tone oscillator MO in stage $100_b$ is tuned to a different frequency than stage $100_a$. The tone oscillators MO are normally tuned to have an output frequency in the 100 Hz to 1800 Hz range.

The linear summing and modulating stage 101 includes the summing amlifier $A_{LS}$ which is a dual input, internally compensated operational amplifier with its non-inverting input connected to ground through resistor $R_{108}$ and its inverting input $A_{LS}$-I connected to the output of switch ES. Biasing resistor $R_{109}$ is connected across amplifier $A_{LS}$ and the output $A_{LS}$-O of amplifier $A_{LS}$ is connected to the input of oscillator VCO.

The voltage controlled oscillator VCO is commercially available from National Semiconductor as their product No. LM566. The modulating input pin No. 5 is connected to stage 101. The timing pin No. 7 is controlled by capacitor $C_{111}$, timing pin No. 8 is controlled by potentiometer $P_{112}$ and the power input pin No. 8 is connected through resistor $R_{112}$. The signal $O_{17}$ is generated at square wave output pin No. 3. The output signal $O_{17}$ is connected to the base of the NPN output transistor $Q_O$ through the coupling and bias network including capacitor $C_{112}$ and diode $CR_{100}$. The collector of transistor $Q_O$ is connected to one side of the input coil $T_O$-I of the tuned output transformer $T_O$ with a coupling capacitor $C_{113}$ thereacross. This causes the output coil $T_O$-O of the transformer $T_O$ to generate the output FM signal $O_{18}$ as seen in FIG. 10 to the network PDN. It will further be noted that all of the tone generating stages are connected to the input $A_{LS}$-I of the amplifier $A_{LS}$ so that the amplifier $A_{LS}$ linearly sums all of the tone signals such as tone signals $O_{14}$ and $O_{15}$ to produce the linearly summed signal $O_{16}$ at the output $A_{LS}$-O of the amplifier $A_{LS}$. The same by-pass units $BP_P$ and $BP_A$ will distribute the signal $O_{18}$ in network PDN.

The receiver $R_R$ in link 12 located at the remote location in the building is coupled to the AC power distribution network PDN and produces binary outputs corresponding to the binary inputs to transmitter Thd C. Receiver $R_R$ seen in FIG. 9 includes a receiver stage 140 and a plurality of tone decoder stages 141, two of which are shown and labelled $141_a$ and $141_b$. Decoder stage $141_a$ is tuned to signal $O_{14}$ while decoder stage $141_b$ is tuned to signal $O_{15}$. The receiver stage 140 is coupled to the AC power distribution network PDN through the decoupling capacitors $C_D$ and input transformer $T_1$ so that the FM signal $O_{18}$ will be received. Stage 140 includes a noise limiter L10 connected across the output winding of input transformer $T_I$ to prevent large noise spikes from destroying the receiver stage 140. The input of a three stage TRF receiver FTR is connected to the output winding of transformer $T_I$ receive and amplify signal O18 in the amplification stages S10, S11 and S12. Interstage noise limiters L11 and L12 are connected to stage S10, S11 and S12 respectively to further attentuate any noise imposed on signal $O_{18}$. Automatic gain control AGC is also provided for receiver FTR. The output of receiver FTR is connected to the input of a transistor limiter TL to convert signal $O_{18}$ back into signal $O_{17}$. The output of limiter TL is connected to a phase locked loop demodulator DM where the signal is demodulated to recover the summed tone signal $O_{16}$. The signal $O_{16}$ is passed through a band pass filter BPF to remove the harmonics and then passes into the tone detector stages 141.

In stage $141_a$, the signal $O_{16}$ is fed through an active filter FAF and then into a phase lock loop tone detector PLLTD tuned to signal $O_{13}$. This causes the input tone signal $O_{13}$ to be detected and the output of the tone detector PLLTD to change state as lone as the tone is received. The output of the tone detector PLLTD is fed into an integrator FIG which integrates the signal. The output of the integrator FIG is fed to a threshhold detector FTD so that when the integrator FIG integrates to a prescribed value, the threshhold detector FTD generates an output which is fed to a latch LH. The latch LH is connected to a timer enable TE connected to both the output of the threshhold detector FTD and the output of the latch LH to prevent the latch LH from changing state for a prescribed time interval after each change of state. This serves to protect the load from being rapidly cycled to burn out the load control circuit. The output of the latch LH is fed to an output switching transistor $Q_{OS}$ which in turn controls a load control relay LCR so that its switch contacts $LCR_1$ operate in accordance with the output signal $O_{10}$ from the computer. Stage $141_b$ detects the input tone $O_{15}$ to be detected and the output of the tone detector PLLTD to change state as long as the tone $O_{15}$ is received. The output of the tone detector PLLTD is fed to an output switching transistor $Q_{OS}$ which in turn controls relay LCR so that its switch contacts $LCR_1$ operate in accordance with the output signal $O_{11}$ from the computer.

Figure 12:
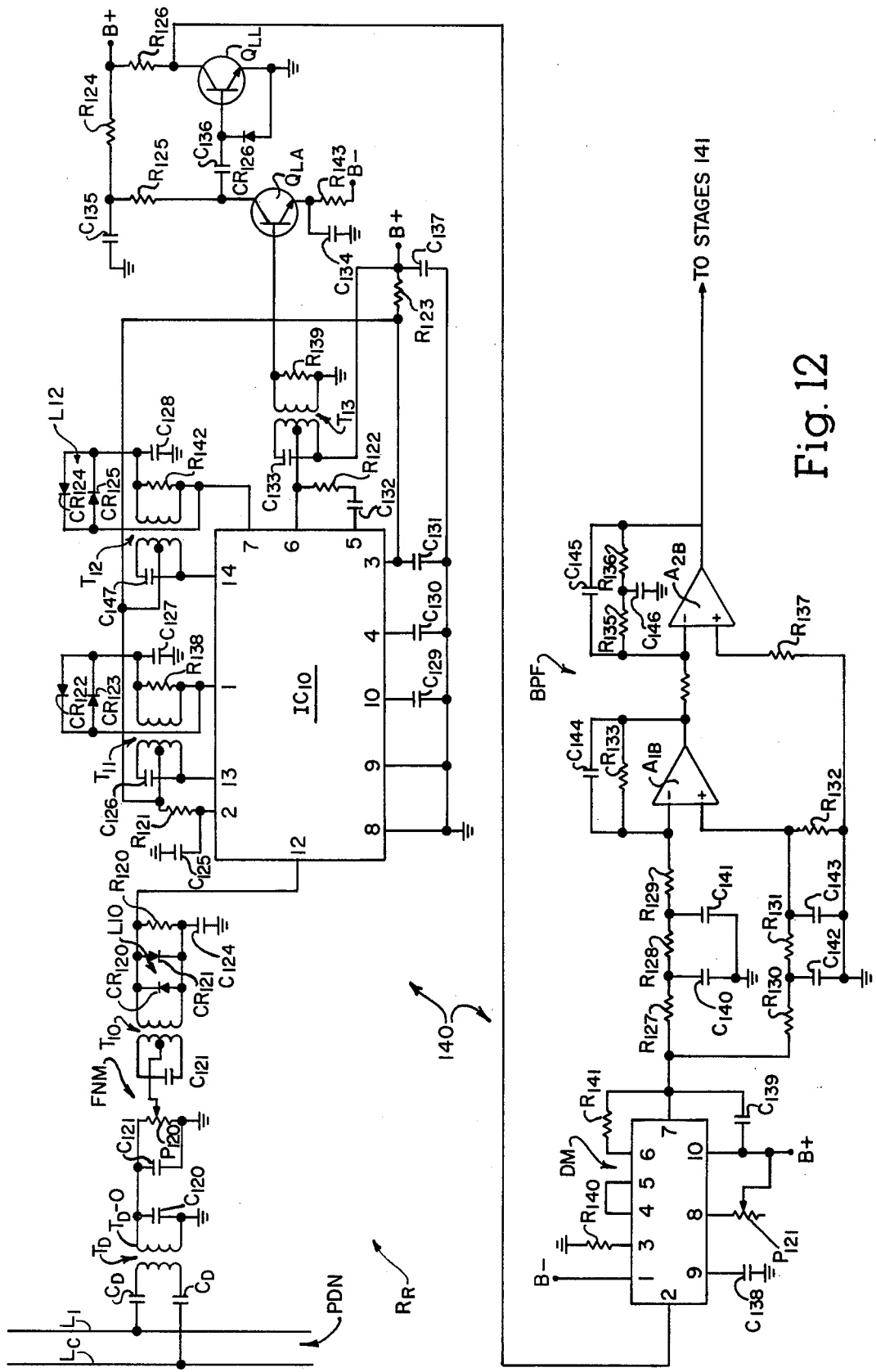
FIG. 12 is a schematic diagram of the receiver stage of the receiver of the output link.
Figure 13:
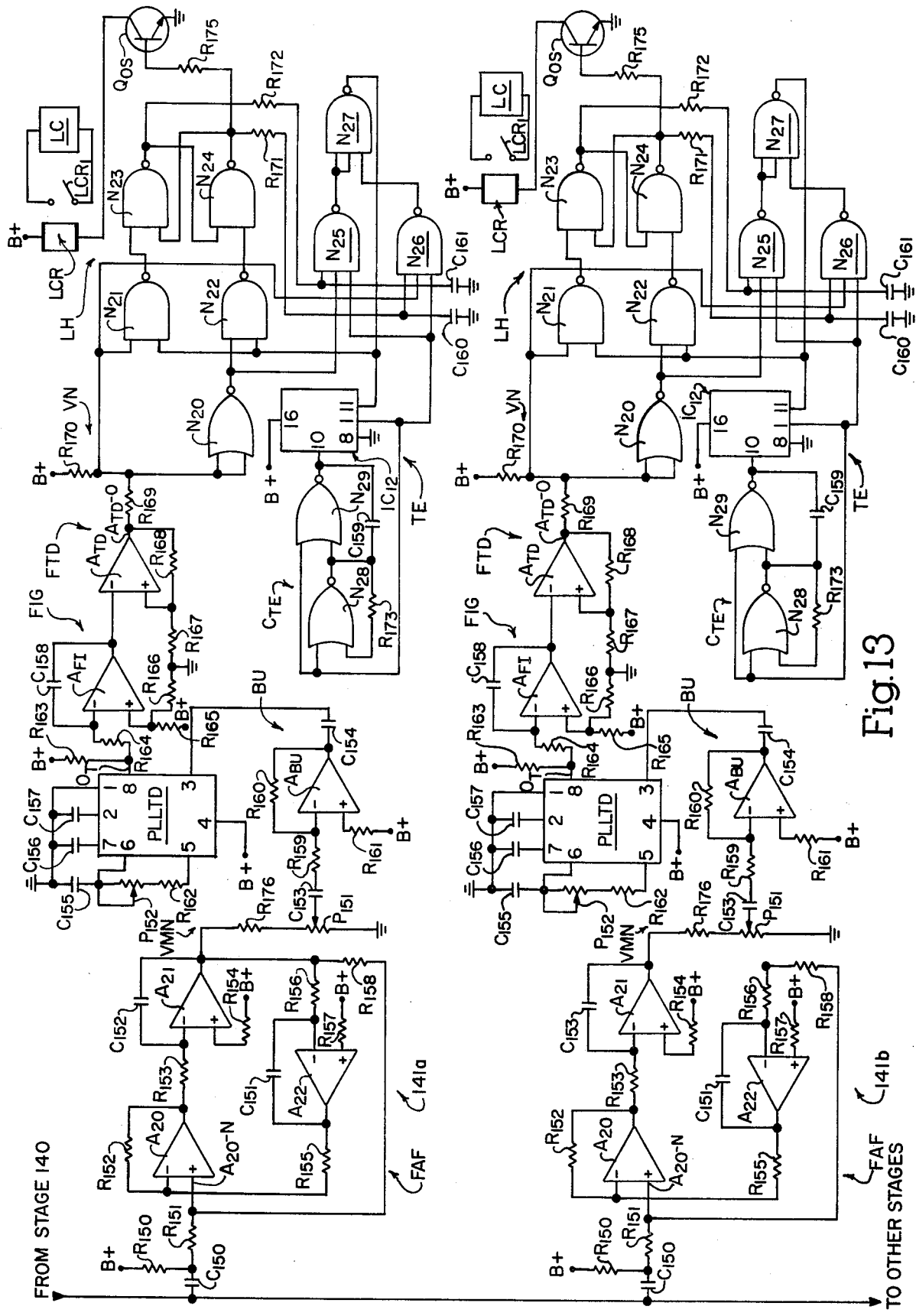
FIG. 13 is a schematic diagram of the tone decoder stage of the receiver of the output link; and, FIG. 14 is a signal diagram illustrating the operation of the tone decoder stage of FIG. 13.

The circuit schematic illustrated in FIG. 12 satisfies the logic diagram for the receiver stage 140 in FIG. 9 and the circuit diagram in FIG. 13 satisfies the logic diagram for the tone decoder stages $141_a$ and $141_b$ in FIG. 9. As seen in FIG. 12, the output winding $T_o$-O of the decoupling transformer $T_D$ with capacitor $C_{120}$ thereacross is connected to a coupling and impedance matching network CIM including potentiometer $P_{120}$, capacitors $C_{121}$ and $C_{122}$ and transformer $T_{10}$. The limiter L10 is a dual diode type limiter comprising diode $CR_{120}$ and $CR_2$ in parallel across the output of transformer $T_{10}$ will resistor $R_{120}$ and capacitor Chd 124.

The receiver FTR is an integrated circuit $IC_{10}$ available from Fairchild Semiconductor under their product designation UA720. The circuit $IC_{10}$ is wired as a TRF receiver. The RF input pin No. 12 and the RF decouple pin No. 11 are connected to the output of transformer $T_{10}$. The oscillator input pin No. 2 is connected to the B+ voltage network of resistor $R_{123}$ and capacitor $C_{137}$ through resistor $R_{121}$ and to ground through capacitor $C_{125}$. First stage tuning transformer $T_{11}$ is connected between the RF output pin No. 13 and the converter input pin No. 1 with capacitor $C_{124}$ across the winding of transformer $T_{11}$ connected to pin No. 13 and with the winding connected to pin No. 1 connected to ground through capacitor $C_{127}$ with resistor $R_{138}$ across the winding. The limiter L11 is connected across the winding of transformer $T_{11}$ connected to pin No. 1 and comprises diodes $CR_{122}$ and $CR_{123}$. The second stage tuning transformer $T_{12}$ is connected between the converter output pin No. 14 and the IF input pin No. 7. Capacitor $C_{147}$ is connected across the winding of transformer $T_{12}$ connected to pin No. 14 and the winding connected to pin No. 7 is connected to ground through capacitor $C_{128}$ with resistor $R_{142}$ across the winding. The winding of transformer $T_{12}$ connected to pin No. 7 also has the limiter L12 connected thereacross comprising diodes $CR_{124}$ and $CR_{125}$. Both ground pin Nos. 8 and 9 are connected to ground. The AGC filter pin No. 10 is connected to ground through capacitor $C_{129}$ while the converter decouple pin No. 4 is connected to ground through capacitor $C_{130}$. The voltage supply network from the B+ voltage source is connected to pin No. 3 which is also connected to ground by capacitor $C_{131}$. The AGC detector input pin No. 5 is coupled to IF output pin No. 6 through capacitor $C_{132}$ and resistor $R_{122}$. The output transformer $T_{13}$ is connected to pin No. 6 with capacitor $C_{133}$ connected across the input winding. The resister $R_{139}$ is connected across the output winding of transformer $T_{13}$. The output of transformer $T_{13}$ is connected to the limiter TL.

Limiter TL includes an amlifier NPN transistor $Q_{LA}$ and a limiter NPN transistor $Q_{LL}$. Transistor $Q_{LA}$ has its base connected to transformer $T_{13}$, its collector biased by resistors $R_{124}$ and $R_{125}$ and capacitor $C_{135}$, and its emitter biased by resistor $R_{143}$ and capacitor $C_{134}$. The collector of transistor $Q_{LA}$ is coupled to the base of transistor $Q_{LL}$ by capacitor $C_{136}$ and biased by diode $CR_{126}$. The collector of transistor $Q_{LL}$ is biased by resistor $R_{126}$. The output on the collector of transistor $Q_{LL}$ is the signal $O_{17}$.

The demodulator DM is a phase locked loop integrated circuit $IC_{11}$ commercially available from National Semiconductor as their product No. LM565. The integrated circuit $IC_{11}$ has its input pin No. 2 connected to ground through resistor $R_{140}$ while the VCO output pin No. 4 is directly connected to the VCO input pin No. 5. The reference output pin No. 6 is connected to the VCO control voltage output pin No. 7 through resistor $R_{141}$. The timing input pin No. 8 is connected to the B+ voltage source through potentiometer $P_{121}$ while the timing pin No. 9 is connected to ground through the capacitor $C_{138}$. The power input pin No. 10 is connected directly to the B+ voltage source while capacitor $C_{139}$ connects pin No. 10 with pin No. 7. The output at pin No. 7 reproduces the signal $O_{16}$.

The band pass filter BPF comprises a pair of amplifiers $A_{1B}$ and $A_{2B}$ with the inverting input of amplifier $A_{1B}$ connected to pin No. 7 on the circuit $IC_{11}$ through the RC filter network comprising resistors $R_{127}$–$R_{129}$ and capacitors $C_{140}$ and $C_{141}$. The non-inverting input of amplifier $A_{1B}$ is connected to pin No. 7 of the circuit $IC_{11}$ through the RC filter network CN comprising resistors $R_{130}$-$R_{132}$ and capacitors $C_{142}$ and $C_{143}$ to provide a reference voltage. The amplifier $A_{1B}$ is biased by resistor $R_{133}$ and capacitor $C_{144}$ between its output and its inverting input. The output of amplifier $A_{1B}$ is connected to the inverting input of amplifier $A_{2B}$ through resistor $R_{134}$ while the non-inverting input of the amplifier $A_{2B}$ is connected to one of the RC filter network CN through resistor $R_{137}$. Biasing is provided for amplifier $A_{2B}$ through resistors $R_{135}$ and $R_{136}$ and capacitors $C_{145}$ and $C_{146}$ between its output and inverting input. The output of amplifier $A_{2B}$ is connected to each of the decoding stages 141.

Referring to FIG. 13, it will be seen that the active filter FAF of each decoder stage 141 is a bi-quad active filter comprising three dual input, internally compensated operational amplifiers $A_{20}$, $A_{21}$ and $A_{22}$ connected to each other through the RC network including resistors $R_{152}$-$R_{158}$ and capacitors $C_{151}$ and $C_{152}$. The non-inverting input $A_{20}$-N of amplifier $A_{20}$ is connected to the output of filter BPF through the voltage coupling network VCN comprising resistors $R_{150}$ and $R_{151}$ and capacitor $C_{150}$. The filter FAF provides gross filtering to the output from the filter BPF to generally allow signal $O_{14}$ present in the output to pass from the filter output $A_{21}$-O. The output $A_{21}$-O is connected to the phase lock loop detector PLLTD through a voltage matching network VMN comprising resistors $R_{159}$ and $R_{176}$, potentiometer $P_{151}$ and capacitor $C_{153}$ and a buffering circuit BC comprising amplifier $A_{BU}$ its inverting input connected to network VMN and its non-inverting input connected to the B+ voltage source through resistor $R_{161}$ and its output biased to the inverting input through resistor $R_{160}$. The output of amplifier $A_{BM}$ is coupled to input of the phase lock loop tone detector PLLTD through coupling capacitor $C_{154}$.

The phase locked loop detector PLLTD is commercially available from National Semiconductor as their product No. LM567. The input pin No. 3 is connected to output $A_{BU}$-O through coupling capacitor $C_{154}$. Timing for pin Nos. 5 and 6 is provided by resistor $R_{162}$, potentiometer $P_{152}$ and capacitor $C_{155}$. Filtering to pin Nos. 1 and 2 is provided by capacitors $C_{156}$ and $C_{157}$. The output $O_T$ from pin No. 8 is biased high through resistor $R_{163}$ to the B+ voltage when no tone signal $O_{14}$ is present and is biased low when tone signal $O_{14}$ is present.

The output $O_T$ is connected to the integrator FIG comprising dual input amplifier $A_{FI}$ with its inverting input $A_{FI}$-I connected to pin No. 8 on the decoder PPLTD through resistor $R_{164}$. The non-inverting input $A_{FI}$-I is connected to the B+ voltage through the voltage divider network with resistors $R_{165}$ and $R_{166}$. The output $A_{FI}$-O is coupled to input $A_{FI}$-I by capacitor $C_{158}$.

Threshhold detector FTD comprises a dual input amplifier $A_{TD}$ with its inverting input $A_{TD}$-I connected to output $A_{FI}$-O so that signal $O_T$ controls amplifier $A_{TD}$. The non-inverting input of amplifier $A_{TD}$ is grounded through resistor $R_{167}$ and its output $A_{TD}$-O is connected to the non-inverting input by resistor $R_{168}$.

The latch LH and the timer enable TE are both connected to the output $A_{TD}$-O of the threshhold detector TD through the voltage network VN including resistors $R_{169}$ and $R_{170}$. The latch LH comprises a NOR gate $N_{20}$ and four NAND gates $N_{21}$-$N_{24}$. Gate $N_{21}$ has one of its inputs connected to the output $A_{TD}$-O through network VN, the gate $N_{20}$ has both of its inputs connected to the output $A_{TD}$-O through the network VN. The output of gate $N_{20}$ is connected to the inputs of gate $N_{22}$. The output of gate $N_{21}$ is connected to one of the inputs of gate $N_{23}$ and the output of gate $N_{22}$ is connected to one of the inputs of gate $N_{24}$. The output of gate $N_{23}$ is cross-coupled to the other input of gate $N_{24}$ while the output of gate $N_{24}$ is cross-coupled to the other input of gate $N_{23}$. The output of gate $N_{24}$ is connected to the switching transistor $O_{OS}$. Control of gates $N_{21}$ and $N_{22}$ is provided by the timer enable TE.

The timer enable TE comprises a gate enabling circuit $G_{TE}$, a clock $C_{TE}$ and a counter $CT_{TE}$. The gating circuit $G_{TE}$ comprises three 3-input NAND gates $N_{25}$-$N_{27}$. Gate $N_{25}$ has one of its inputs connected to the output of gate $N_{23}$ through resistor $R_{172}$ and also connected to ground through capacitor $C_{161}$. Another of the inputs to gate $N_{25}$ is connected to the output of gate $N_{20}$. The output of gate $N_{25}$ is connected to two inputs of gate $N_{27}$. One input of gate $N_{26}$ is connected to the output of gate $N_{24}$ through resistor $R_{171}$ and to ground through capcitor $C_{160}$. Another of the inputs to gate $N_{26}$ is connected to the output $A_{TD}$-O through network VN. The output of gate $N_{26}$ is connected to the other input of gate $N_{27}$. The output of gate $N_{27}$ controls the counter $CT_{TE}$. The output 27 of gate $N_{27}$ also controls the transfer gates $N_{21}$ and $N_{22}$ since this output is connected to the other input of each of these gates.

The counter $CT_{TE}$ is a 12-stage ripple-carry binary counter and is commercially available as an integrated circuit $IC_{12}$ from RCA as their product No. CD4040. Circuit $IC_{12}$ has its reset input pin No. 11 connected to the output of gate $N_{27}$ to reset the counter. Driving pin No. 10 of circuit $IC_{12}$ is driven from the clock $C_{TE}$ while the twelfth stage output pin No. 1 is connected to the third input of each of gates $N_{25}$ and $N_{26}$.

The clock $C_{TE}$ is a keyed oscillator comprising two dual-input NOR gates $N_{28}$ and $N_{29}$ with the keyed input to each of the gates $N_{28}$ and $N_{29}$ connected to pin No. 1 of circuit $IC_{12}$. The clocking rate is controlled by resistors $R_{173}$ and $R_{174}$ and capcitor $C_{159}$. The clock output appears at the output of gate $N_{29}$ and is connected directly to the drive pin No. 10 of the integrated circuit $IC_{12}$. For better understanding of the operation of the latch LH and the timer enable TE, the output signals of the various components are illustrated in FIG. 14.

Figure 14:
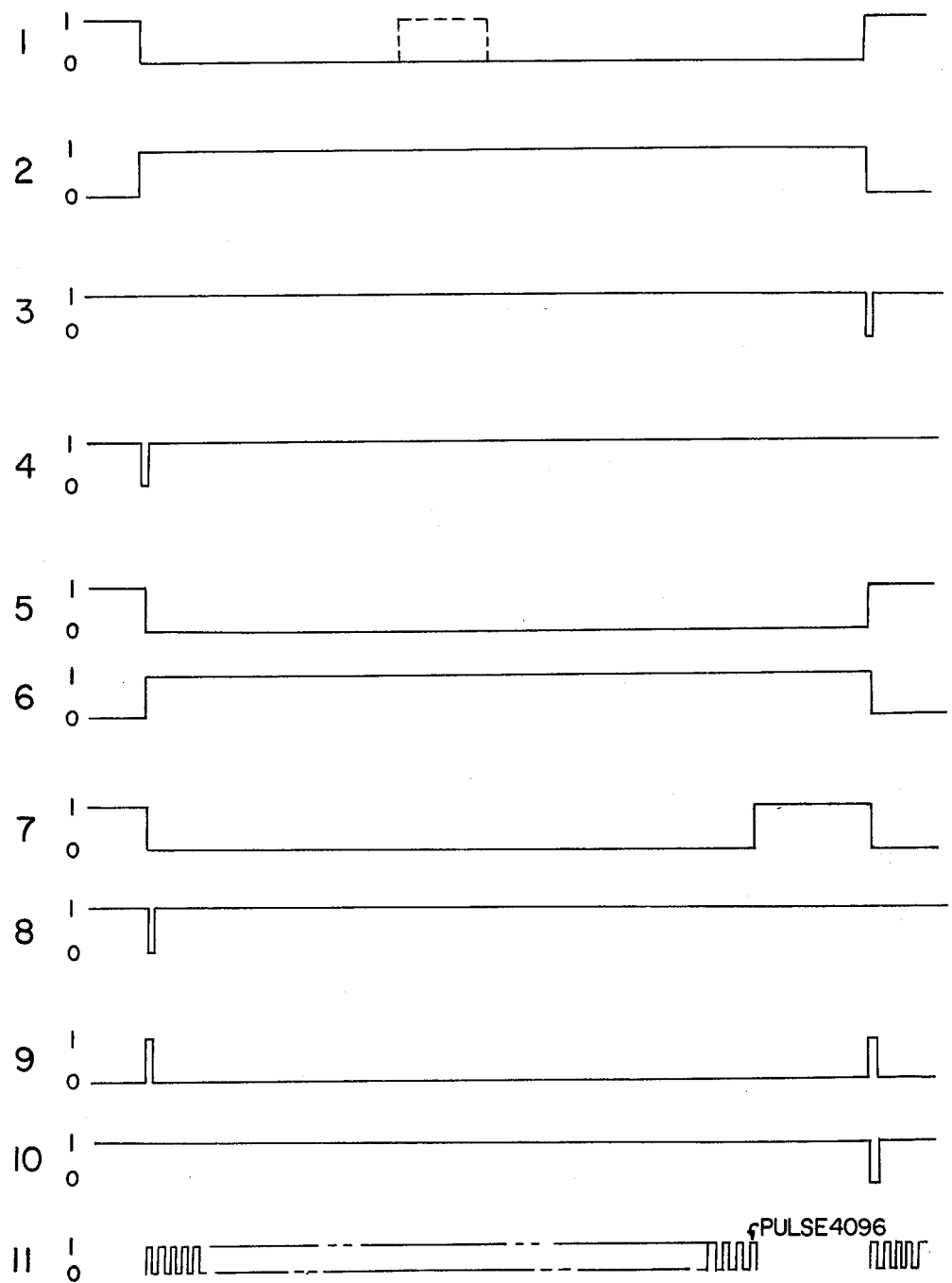

In FIG. 14, signal 1 is the output of the threshhold detector FTD, signal 2 is the output of gate $N_{20}$, signal 3 is the output of gate $N_{21}$, signal 4 is the output of gate $N_{22}$, signal 5 is the output of gate $N_{23}$, signal 6 is the output of gate $N_{24}$, signal 7 is the output of pin No. 1 of the circuit $IC_{12}$, signal 8 is the output of gate $N_{25}$, signal 9 is the output of gate $N_{27}$, signal 10 is the output of gate $N_{26}$, and signal 11 is the output of the clock $C_{TE}$ at the output of gate $N_{29}$. Assuming that the equipment controlled by the latch LH is operating normally signal 1 from threshhold detector FTD will remain high until a tone is detected by the detector PLLTD which then causes the signal 1 to go low and remain low as long as the tone is detected by the detector PLLTD. In its normal condition where the equipment is allowed to operate, the output of gate $N_{23}$ will be high while the output of gate $N_{24}$ will be low. Thus, when signal 1 goes low, signal 2 from gate $N_{20}$ goes high. This causes all three inputs to gate $N_{25}$ to be high thereby causing the output signal 8 from gate $N_{25}$ to go low. This causes the gate $N_{27}$ to go high which in turn enables the transfer gates $N_{21}$ and $N_{22}$ so that output signal 4 from gate $N_{22}$ momentarily goes low. The latch LH transfers state so that signal 5 from gate $N_{23}$ goes low while signal 6 from gate $N_{24}$ goes high. This causes the switching transistor $Q_{LS}$ to disable the load through relay LCR connected thereto. At the same time, signal 9 from gate $N_{27}$ momentarily going high resets the counter $CT_{TE}$ so that signal 7 at pin No. 1 goes low to enable the clock $C_{TE}$ so that output signal 11 therefrom is generated. The counter holds the signal 7 low until the counter has counted out at pulse 4096 from clock $C_{TE}$. At this time, the signal 7 again goes high to enable gates $N_{25}$ and $N_{26}$. Because the signal 7 remains low during the entire time that the counter is operating, a change in signal 1 as illustrated by dashed lines in FIG. 14 will have no affect on the latch LH so that the load control remains in the same condition until the counter $CT_{TE}$ has counted out. If signal 1 is still low as illustrated in FIG. 14, the latch LH will remain in its same condition until there is a change in signal 1. When signal 1 again goes high signal 2 accordingly goes low. Since signal 1 is high, all three inputs to gate $N_{26}$ are high thereby causing signal 10 to go low. This causes the signal 9 from gate $N_{27}$ to momentarily go high and enable the transfer gates $N_{21}$ and $N_{22}$. The output signal 3 goes low to transfer the latch LH thereby causing signal 5 from gate $N_{23}$ to again go high while signal 6 from gate $N_{24}$ again goes low. This causes the signal 10 from the gate $N_{26}$ to again go high and the signal 9 from the gate $N_{27}$ to again go low thereby disabling the gates $N_{21}$ and $N_{22}$ until the counter $CT_{TE}$ has again counted out. By selecting the appropriate clocking rate for clock $C_{TE}$ and/or drive pin of counter $CT_{TE}$, the disabled time for latch LH can be easily controlled.

We claim:

1. A current carrier communication system for selectively transmitting binary electrical signals from a first location to a second location over the AC power lines in an AC power distribution network in a building comprising:

at least first and second sources of binary electrical signals at said first location;

a first tone generating means operatively connected to said first source of binary electrical signals for generating a first tone signal at a first frequency in response to the binary electrical signal from said first source of binary electrical signals;

a second tone generating means operatively connected to said second source of binary electrical signals for generating a second tone signal at a second frequency, in response to the binary electrical signal from said second source of binary electrical signals;

linear tone summing means operatively connected to said first and second tone generating means for generating a modulating signal output that is a linear sum of said first and second tone signals;

a source of RF signals operatively connected to said linear tone summing means to produce a modulated RF output signal modulated by said modulating signal output of said linear tone summing means;

transmission coupling means at said first location directly coupling said modulated RF output signal to the AC power lines;

receiver coupling means at said second location directly coupled to the AC power lines to receive said modulated RF output signal therefrom;

TRF multi-stage receiver means operatively connected to said receiver coupling means for receiving said modulated RF output signal therefrom and producing an amplified modulated RF output signal corresponding to said received modulated RF output signal;

differential signal generator means connected to said TRF receiver means for generating a first differential output signal corresponding to said RF output signal from said TRF receiver means and a second differential output signal corresponding to said RF output signal from said TRF receiver means but with a 180° phase shift from said first differential output signal;

first demodulation means operatively connected to said first differential output signal from said differential signal generator means for demodulating said first differential output signal to produce a first demodulated output signal;

second demodulation means operatively connected to said second differential output signal from said differential signal generator means for demodulating said second differential output signal to produce a second demodulated output signal;

combining means operatively connected to said first and second demodulated output signals from said first and second demodulation means for combining said first and second demodulated output signals to eliminate even order noise therefrom present in said RF output signal and producing a composite signal output corresponding in frequency to said linearly summed modulating signal output of said linear tone summing means;

first phase locked loop detector means operatively connected to said demodulation means for detecting the presence of a tone in said composite signal output corresponding to said first tone signal from said first tone generating means and generating a first detected binary electrical signal output corresponding to the binary electrical signal from said first source of binary electrical signals; and, second phase locked loop detector means operatively connected to said demodulation means for detecting the presence of a tone in said composite signal output corresponding to said second tone signal from said second tone generating means and generating a second detected binary electrical signal output corresponding to the binary electrical signal from said second source of binary electrical signals.

2. The current carrier communication system of claim 1 further including limiter means operatively connected to said TRF receiver means for selectively attenuating noise received by said receiver means between stages.

3. The current carrier communication system of claim 1 further including first active filter means operatively connecting said combining means and said first phase locked loop detector means for preliminarily blocking those tones in said composite signal except that tone corresponding to said first tone signal; and second active filter means operatively connecting said combining means and said second phase locked loop detector means for preliminarily blocking those tones in said composite signal except that tone corresponding to said second tone signal.

4. The current carrier communication system of claim 1 further including first integrating means operatively connected to said first phase locked loop detector means for integrating said first detected binary electrical signal output; first threshhold detector means operatively connected to said first integrating means to generate a first output corresponding to the binary electrical signal from said first source of binary electrical signals; second integrating means operatively connected to said second phase locked loop detector means for integrating said second detected binary electrical signal output; and second threshhold detector means operatively connected to said second integrating means to generate a second output corresponding to the binary electrical signal from said second source of binary electrical signals.

5. The current carrier communication system of claim 1 further including by-pass means operatively coupling said RF output signal across high frequency impedances in the AC power lines.

6. The current carrier communication system of claim 5 wherein said by-pass means includes an RF coupling transformer having an input coil and at least one output coil, first capacitive means connecting said input coil to the AC power lines carrying said RF output signal, and second capacitive means connecting said output coil to the AC power lines isolated by the impedance.

7. A current carrier communication system for selectively transmitting binary electrical signals from a first location to a second location over the AC power lines in an Ac power distribution network in a building comprising:
- at least first and second sources of binary electrical signals at said first location;
- a first tone generating means operatively connected to said first source of binary electrical signals for generating a first tone signal at a first frequency in response to the binary electrical signal from said first source of binary electrical signals;
- a second tone generating means operatively connected to said second source of binary electrical signals for generating a second tone signal at a second frequency, in response to the binary electrical signal from said second source of binary electrical signals;
- linear tone summing means operatively connected to said first and second tone generating means for generating a modulating signal output that is a linear sum of said first and second tone signals;
- a source of RF signals operatively connected to said linear tone summing means to produce a modulated RF output signal modulated by said modulating signal output of said linear tone summing means;
- transmission coupling means at said first location directly coupling said modulated RF output signal to the AC power lines;
- receiver coupling means at said second location directly coupled to the AC power lines to receive said modulated RF output signal therefrom;
- TRF multi-stage receiver means operatively connected to said receiver coupling means for receiving said modulated RF output signal therefrom and producing an amplified modulated RF output signal corresponding to said received modulated RF output signal;
- demodulation means operatively connected to said TRF receiver means for demodulating said amplified modulated RF output signal and producing a composite signal output corresponding in frequency to said linearly summed modulating signal output of said linear tone summing means;
- first phase locked loop detector means operatively connected to said demodulation means for detecting the presence of a tone in said composite signal output corresponding to said first tone signal from said first tone generating means and generating a first detected binary electrical signal output corresponding to the binary electrical signal from said first source of binary electrical signals;
- first integrating means operatively connected to said first phase locked loop detector means for integrating said first detected binary electrical signal output;
- first threshhold detector means operatively connected to said first integrating means to generate a first detected output corresponding to the binary electrical signal from said first source of binary electrical signals;
- second phase locked loop detector means operatively connected to said demodulation means for detecting the presence of a tone in said composite signal output corresponding to said second tone signal from said second tone generating means and generating a second detected binary electrical signal output corresponding to the binary electrical signal from said second source of binary electrical signals;
- second integrating means operatively connected to said second phase locked loop detector means for integrating said second detected binary electrical signal output;
- second threshhold detector means operatively connected to said second integrating means to generate a second detected output corresponding to the binary electrical signal from said second source of binary electrical signals; and
- first latch means operatively connected to said first threshhold detector means and operated by said first detected output, first time enable means operatively connected to said first threshhold detector means for selectively disabling said first latch means for a first prescribed period of time each time said first latch means changes state, second latch means operatively connected to said second threshhold detector means and operated by said second detected output, and second time enable means operatively connected to said second threshhold detector means for selectively disabling said second latch means for a second prescribed period of time each time said second latch means changes state.

* * * * *